(12) United States Patent
Asako et al.

(10) Patent No.: US 6,215,511 B1
(45) Date of Patent: Apr. 10, 2001

(54) OPTICAL WRITING HEAD DRIVING DEVICE

(75) Inventors: Makoto Asako, Tachikawa; Kenji Takano, Kawagoe; Kazutaka Otsuka, Hachioji; Yutaka Ichimura, Yokohama; Yukio Akita, Tokyo; Yoshiyuki Matsuoka; Kozoh Satoh, both of Tokorozawa; Tsutomu Kobayashi, Higashiyamato, all of (JP)

(73) Assignees: Casio Computer Co., Ltd, Tokyo; Casio Electronics Manufacturing Co., Ltd., Iruma, both of (JP)

( * ) Notice: Subject to any disclaimer, the term of this patent is extended or adjusted under 35 U.S.C. 154(b) by 0 days.

(21) Appl. No.: 09/102,398

(22) Filed: Jun. 22, 1998

(30) Foreign Application Priority Data

Jun. 27, 1997 (JP) .................................................... 9-172335
Oct. 29, 1997 (JP) .................................................... 9-297488

(51) Int. Cl.[7] ........................................................ B41J 2/45
(52) U.S. Cl. ............................................ 347/234; 347/237
(58) Field of Search .................................. 347/116, 234, 347/237

(56) References Cited

U.S. PATENT DOCUMENTS

| | | | | |
|---|---|---|---|---|
| 4,575,739 | * | 3/1986 | De Schampelaere et al. | 347/237 |
| 4,912,491 | * | 3/1990 | Hoshino et al. | 347/116 |
| 5,040,003 | | 8/1991 | Willis . | |
| 5,274,394 | * | 12/1993 | Corona et al. | 347/237 |
| 5,585,836 | * | 12/1996 | Pham et al. | 347/237 |
| 5,719,680 | | 2/1998 | Yoshida et al. . | |

FOREIGN PATENT DOCUMENTS

| | | | |
|---|---|---|---|
| 0 701 180 A2 | 3/1996 | (EP) . | |
| 2226736 | 7/1990 | (GB) . | |
| 62-161541 | * 7/1987 | (JP) | ................................ B41J/3/04 |
| 63-64775 | * 3/1988 | (JP) | ................................ B41J/3/21 |
| 5-084972 | 4/1993 | (JP) . | |
| 7-304211 | 11/1995 | (JP) . | |
| 9-188000 | 7/1997 | (JP) . | |
| 9-234905 | 9/1997 | (JP) . | |

\* cited by examiner

*Primary Examiner*—David F. Yockey
(74) *Attorney, Agent, or Firm*—Frishauf, Holtz, Goodman, Langer & Chick, P.C.

(57) ABSTRACT

A printer controller 41 sets compensation values, representing the positional deviations of LED array chips 31, in a delay circuit section 68 via shift register 61 and a latch circuit 63. The shift register 69 sequentially acquires bit map data from the printer controller 41, and supplies the acquired bit map data to an AND gate 66 through the latch circuit 62. Upon receiving a strobe signal from the printer controller 41, the delay circuit section 68 supplies the received strobe signal to the AND gate 66 after a delay time corresponding to a preset compensation value has lapsed. The AND gate 66 generates drive signals each being the logical product of the input bit map data and the strobe signal, and supplies them to the LED array chips 31 through a buffer 67. The LED array chips 31 make LEDs emit light at the timings corresponding to the positional deviations so that images are formed without a positional deviation. At least one of the LED array chips is unaligned with adjacent ones of the LED array chips and preset compensation values are obtained by interpolation based on detected positional deviations of sampled ones of the LED array chips.

5 Claims, 22 Drawing Sheets

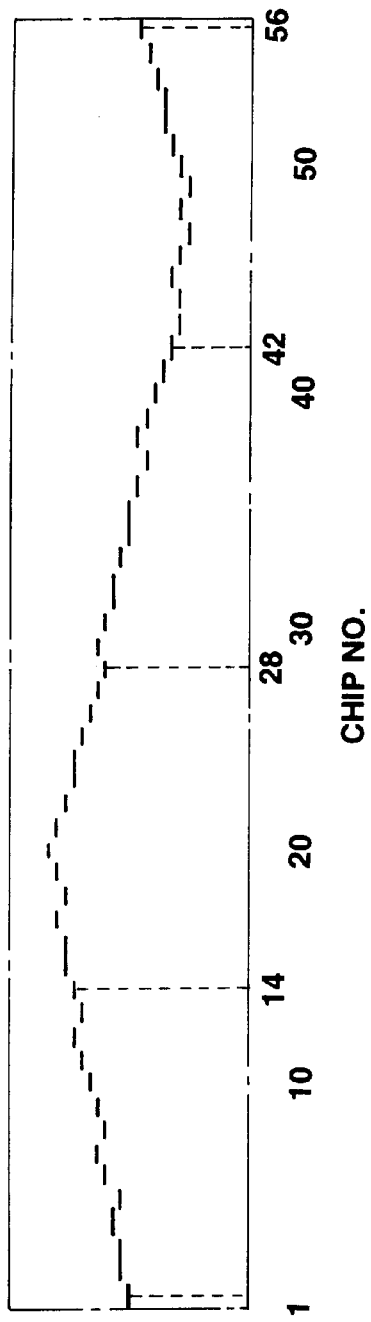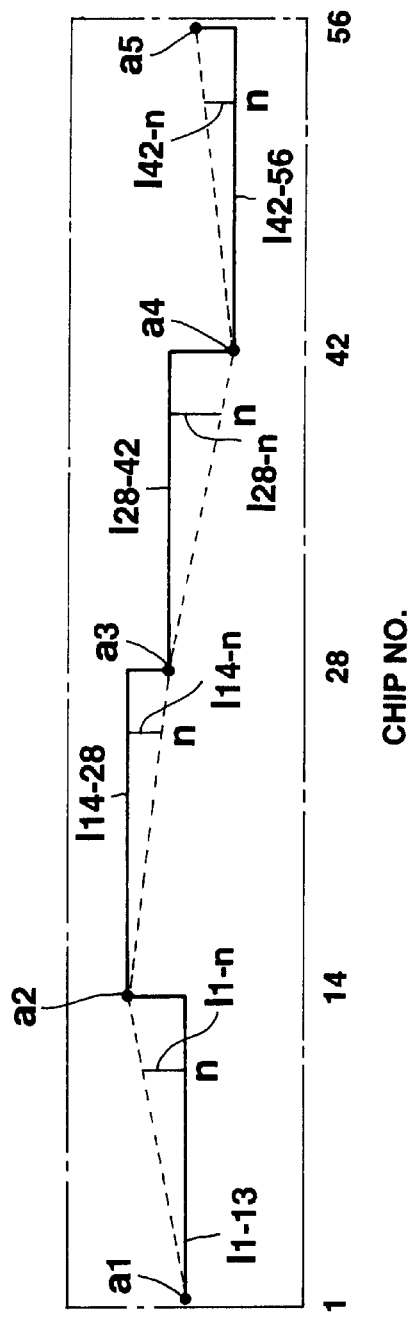
FIG.20A
FIG.20B

OPTICAL WRITING HEAD DRIVING DEVICE

BACKGROUND OF THE INVENTION

1. Field of the Invention

The present invention relates to a device and method for driving optical writing heads which optically write image information on photoconductors by illuminating those photoconductors with the light emitted from light sources in an electrophotographic recording apparatus for performing printing by electrophotography.

2. Description of the Related Art

A color electrophotographic recording apparatus, which creates a color image by forming images of individual color components one after another and superimposing those images on one another, has become known in recent years. The color electrophotographic recording apparatus is a tandem-type one including four image forming units, each of which forms an image in a corresponding one of four colors, i.e., yellow (Y), magenta (M), cyan (C) and black (BK). The color electrophotographic recording apparatus forms a color image by superimposing the images formed by the image forming units on one another. The image forming units illuminate photosensitive drums with the light emitted from light sources, thereby optically writing image information so that electrostatic latent images are formed on the photosensitive drums. The image forming units adhere color toners to the electrostatic images and transfer the toner images thus formed from the photosensitive drums to a sheet of recording paper. The image forming units cause optical writing heads, employing LEDs, semiconductor lasers or the like as the light sources, to illuminate the photosensitive drums with the LED light or the like in order to optically write the image information.

Each of the optical writing heads includes, for example, LEDs which are arranged in a line along a main scanning direction or the direction of a print width, and optically writes the image information on the photosensitive drums. The optical writing performed by the optical writing heads will now be explained as an example, with reference to FIGS. 22 and 23.

FIG. 22 is a diagram exemplifying one of conventional driving circuits. Each of the driving circuits causes the LED array included in a corresponding one of the optical writing heads to emit light. FIG. 23 is a timing chart showing the timing of the operation of the conventional driving circuit illustrated in FIG. 22.

The driving circuit illustrated in FIG. 22 includes a shift register 100, a latch circuit 101, an AND gate 102, a buffer 103 and an LED array 104.

The shift register 100 sequentially acquires bit map data (DATA) from an non-illustrated interface circuit, in synchronization with a clock signal (CLK). The shift register 100 outputs the acquired bit map data to the latch circuit 100 in a parallel fashion.

In accordance with a latch signal (LAT) sent from the non-illustrated interface circuit, the latch circuit 101 latches the bit map data output from the shift register 100, and outputs the latched bit map data corresponding to one line to the AND gate 102.

The AND gate 102 generates a driving signal which is the logical product of the bit map data output from the latch circuit 101 and a strobe signal (STB) sent from the non-illustrated interface circuit, and outputs the driving signal to the LED array 104 through the buffer 103.

The LED array 104 makes its own LEDs emit light in accordance with the driving signal which has been output from the AND gate 103 through the buffer 103. The LED array 104 optically writes image information on its corresponding photosensitive drum by illuminating the drum with the LED light in accordance with the driving signal which has been output from the AND gate 102 through the buffer 103.

The color electrophotographic recording apparatus forms electrostatic latent images on the photosensitive drums by making the optical writing heads of the image forming units perform the optical writing. The color electrophotographic recording apparatus makes the image forming units adhere yellow (Y) toner, magenta (M) toner, cyan (C) toner and black (BK) toner to the formed electrostatic latent images, and transfers the toner images adhering to the photosensitive drums to a sheet of recording paper so that the toner images are superimposed on one another. The color electrophotographic recording apparatus fuses the transferred toner images to the sheet of recording paper, thus printing a color image.

In order to form a color image of high quality, however, the color electrophotographic recording apparatus needs to precisely form the images in the individual colors and accurately superimpose those images on one another. The image forming units are required to precisely form the electrostatic latent images on the photosensitive drums and accurately transfer the toner images or the electrostatic latent images bearing the toners to a sheet of recording paper so that those images are accurately superimposed on one another on the sheet of recording paper.

Even if the image superimposing accuracy at the time of the image transfer is improved, the color electrophotographic recording apparatus cannot form a high quality color image unless each optical writing head optically writes an electrostatic latent image in the accurate position on its corresponding photosensitive drum. When the optical writing accuracy is low, each optical writing head cannot form an electrostatic latent image in the accurate position on the corresponding photosensitive drum. This results in the formation of a low quality color image. The precision of the arrangement of the LEDs forming LED arrays and the precision of the illumination of the LED light influence the optical writing accuracy. When the precision of the arrangement of the LEDs and the precision of the illumination of the LED light are low, each optical writing head forms a low quality image deviating from the intended position.

The LEDs need to be highly precisely aligned with each other along a sub scanning direction or the direction in which recording paper is conveyed. For example, in the case of printing an image with a resolution of 300 dpi on a A3-sized sheet (a print width of approx. 300 mm) through utilization of 84.7 $\mu$m×84.7 $\mu$m LEDs, approximately 3500 LEDs need to be aligned with each other in each optical writing head.

An explanation will now be made in regard to an electrostatic latent image which an optical writing head forms when some of the LED array chips forming the LED array 104 are out of alignment and deviate from the designed positions in the sub scanning direction as shown in FIG. 24A.

In the LED array 104, LED array chips Nos. [1], [4] and [8] are arranged along the "0" line as shown in FIG. 24A. LED array chip No. [2] deviates by "1" from the "0" line in a "−" direction, LED array chip No. [3] deviates by "2" from the "0" line in the "−" direction, LED array chip No. [5]

deviates by "1" from the "0" line in a "+" direction, LED array chip No. [6] deviates by "2" from the "0" line in the "+" direction, and LED array chip No. [7] deviates by "1" from the "0" line in the "+" direction.

Under the above-described conditions, the optical writing head forms a electrostatic latent image deformed as illustrated in FIG. 24C, not the intended image "A" shown in FIG. 24B. The optical writing head illuminates its corresponding photosensitive drum with the LED light which deviates in the sub scanning direction in correspondence with the positional deviations of LED array chips, and as a result, forms a deformed electrostatic latent image such as that shown in FIG. 24C on the corresponding photosensitive drum.

In the case of illuminating each photosensitive drum with the LED light coming from the corresponding LED array 104 through lenses such as a convergent photoconductor array or the like, a high order of straightforwardness of the LED light passing through the lenses is required of the optical writing heads. However, the LED light passing through the lenses skews, although the amount of skew is on the order of 0.1 mm or less and thus the skew is so small as cannot be recognized by human eyes.

The optical writing heads of the image forming units are also required to be arranged precisely in their respective designed positions. Even if the optical writing heads optically write images with high accuracy on their corresponding photosensitive drums, the images will not constitute a high quality color image on a sheet of recording paper unless the images exactly overlap each other on the sheet of recording paper. A low quality color image, made up of those images in individual colors which do not exactly overlap each other and deviate from a predetermined position, is formed when the arrangement of the LEDs deviates from the designed position in the sub scanning direction or when a θ-directional deviation (deviation in a direction around a vertical axis perpendicular to a direction in which the LEDs are arranged) occurs. The "θ-directional deviation" is the phenomenon wherein one end and the other end of the arrangement of the LEDs are different from each other in the amount of deviation in the sub scanning direction.

Such a low quality color image is formed also when the rotational speeds of the photosensitive drums differ from each other because of any manufacturing errors of a system for driving the photosensitive drums or the eccentricity of the photosensitive drums, and when a speed variation occurs in a conveyor system such as a conveyor belt, etc.

High quality optical writing heads which are free from the above-described drawbacks and wherein the arrangement of the LEDs and the illumination of the LED light are precise, are difficult to manufacture. The manufacturing of such optical writing heads takes long time, and the manufacturing yield is low accordingly.

SUMMARY OF THE INVENTION

It is accordingly an object of the present invention to provide an optical writing head driving device and an optical writing head driving method, by which a high quality color image made up of images whose positional deviations have been reduced can be formed.

According to the first aspect of the present invention having the above object, there is provided an optical writing head driving device for driving an optical writing head which emits light and optically writes information on a photoconductor by illuminating the photoconductor with the light, the optical writing head having light emitting elements arranged along a main scanning direction, the optical writing head driving device comprising:
  image data acquiring means for acquiring image data;
  storing means for storing compensation data representing amounts in which the light emitting elements deviate from designed positions in a sub scanning direction;
  timing signal generating means for generating timing signals to compensate for positional deviations of the light emitting elements in the sub scanning direction, in accordance with the compensation data stored in the storing means; and
  driving means for making the light emitting elements emit light, in accordance with the image data acquired by the image data acquiring means and in synchronization with the timing signals generated by the timing signal generating means.

In the above-described optical writing head driving device, the image data acquiring means acquires image data form an external peripheral device. The storing means stores compensation data representing the amounts in which the light emitting elements of the optical writing head deviate from their respective designed positions in the sub scanning direction. In accordance with the compensation data stored in the storing means, the timing signal generating means generates the timing signals to compensate for the positional deviations of the light emitting elements in the sub scanning direction. The driving means makes the light emitting elements of the optical writing head emit light, in accordance with the image data acquired by the image data acquiring means and in synchronization with the timing signals generated by the timing signal generating means. The above-described structures enable the optical writing head driving device to optically write on the photoconductor an image in which the positional deviation of the light emitting elements of the optical writing head in the sub scanning direction have been compensated for so that a high quality image, made up of images whose positional deviations have been reduced, can be formed.

In the optical writing head driving device described above, the timing signal generating means includes delay circuits which generate timing signals for delaying timings of operations of the light emitting elements in accordance with the compensation data stored in the storing means.

According to the second aspect of the present invention having the above object, there is provided an optical writing head driving device for driving an optical writing head which emits light and optically writes information on a photoconductor by illuminating the photoconductor with the light, the optical writing head having light emitting arrays which are arranged along a main scanning direction and each of which includes light emitting elements of a predetermined number, the optical writing head driving device comprising:
  image data acquiring means for acquiring image data;
  storing means for storing compensation data representing amounts in which the light emitting arrays deviate from designed positions in a sub scanning direction;
  timing signal generating means for generating timing signals to compensate for positional deviations of the light emitting arrays in the sub scanning direction, in accordance with the compensation data stored in the storing means; and
  driving means for making light emitting elements of the light emitting arrays emit light, in accordance with the image data acquired by the image data acquiring means and in synchronization with the timing signals generated by the timing signal generating means.

In the above-described optical writing head driving device, the image data acquiring means acquires image data from an external peripheral device. The storing means stores compensation data representing the amounts in which the light emitting arrays of the optical writing head deviate from their respective designed positions in the sub scanning direction. In accordance with the compensation data stored in the storing means, the timing signal generating means generates the timing signals to compensate for the positional deviations of the light emitting arrays in the sub scanning direction. The driving means makes the light emitting arrays of the optical writing head emit light, in accordance with the image data acquired by the image data acquiring means and in synchronization with the timing signals generated by the timing signal generating means. The above-described structures enable the optical writing head driving device to optically write on the photoconductor an image in which the positional deviation of the light emitting arrays of the optical writing head in the sub scanning direction have been compensated for so that a high quality image, made up of images whose positional deviations have been reduced, can be formed.

According to the third aspect of the present invention having the above object, there is provided an optical writing head driving device for driving an optical writing head which emits light and optically writes information on a photoconductor by illuminating the photoconductor with the light, the optical writing head having LEDs arranged along a main scanning direction, the optical writing head driving device comprising:

a shift register and a latch circuit, both for acquiring image data;

an EEPROM for storing compensation data representing amounts in which the LEDs deviate from designed positions in a sub scanning direction;

delay circuits for generating strobe signals to compensate for positional deviations of the LEDs in the sub scanning direction, in accordance with the compensation data stored in the EEPROM; and an AND gate and a buffer, both for making the LEDs emit light, in accordance with the image data acquired by the shift register and the latch circuit and in synchronization with the strobe signals generated by the delay circuits.

In the optical writing head driving device described above, the shift register and the latch circuit acquire image data from an external peripheral device. The EEPROM stores compensation data representing the amounts in which the LEDs of the optical writing head deviate from their respective designed positions in the sub scanning direction. In accordance with the compensation data stored in the EEPROM, the delay circuits generate the strobe signals to compensate for the positional deviations of the LEDs in the sub scanning direction. The AND gate and the buffer make the LEDs of the optical writing head emit light, in accordance with the image data acquired by the shift register and the latch circuit and in synchronization with the strobe signals generated by the delay circuits. The above-described structures enable the optical writing head driving device to optically write on the photoconductor an image in which the positional deviation of the LEDs of the optical writing head in the sub scanning direction have been compensated for so that a high quality image, made up of images whose positional deviations have been reduced, can be formed.

According to the fourth aspect of the present invention having the above object, there is provided an optical writing head driving device for driving optical writing heads which emit light and optically write information on photoconductors by illuminating the photoconductors with the light, each of the optical writing heads having light emitting elements arranged along a main scanning direction, the optical writing head driving device comprising:

image data acquiring means for acquiring image data;

storing means for storing compensation data representing amounts in which the light emitting elements of each of the optical writing heads deviate from designed positions in a sub scanning direction;

timing signal generating means for generating timing signals to compensate for positional deviations of the light emitting elements in the sub scanning direction, in accordance with the compensation data stored in the storing means; and driving means for making the light emitting elements of each of the optical writing heads emit light, in accordance with the image data acquired by the image data acquiring means and in synchronization with the timing signals generated by the timing signal generating means.

In the above-described optical writing head driving device, the image data acquiring means acquires image data from an external peripheral device. The storing means stores compensation data representing the amounts in which the light emitting elements of the optical writing heads deviate from their respective designed positions in the sub scanning direction. In accordance with the compensation data stored in the storing means, the timing signal generating means generates the timing signals to compensate for the positional deviations of the light emitting elements in the sub scanning direction. The driving means makes the light emitting elements of the optical writing heads emit light, in accordance with the image data acquired by the image data acquiring means and in synchronization with the timing signals generated by the timing signal generating means. The above-described structures enable the optical writing head driving device to optically write, on the photoconductors, images in which the positional deviation of the light emitting elements of the optical writing heads in the sub scanning direction have been compensated for so that a high quality image, made up of images whose positional deviations have been reduced, can be formed.

According to the fifth aspect of the present invention having the above object, there is provided an optical writing head driving device for driving an optical writing head which emits light and optically writes information on a photoconductor by illuminating the photoconductor with the light, the optical writing head having light emitting elements arranged along a main scanning direction, the optical writing head driving device comprising:

image data acquiring means for acquiring image data;

image data storing means having predetermined areas for storing the image data acquired by the image data acquiring means;

storing means for storing compensation data items representing amounts in which the light emitting elements deviate from designed positions in a sub scanning direction;

image data readout means for reading out the image data from areas of the image data storing means which correspond to positional deviations of the light emitting elements in the sub scanning direction, in accordance with the compensation data items stored in the storing means; and driving means for making the light emitting elements emit light, in accordance with the image data read out by the image data readout means.

In the above-described optical writing head driving device, the image data acquiring means acquires image data from an external peripheral device. The image data storing means stores, in its predetermined areas, the image data acquired by the image data acquiring means. The storing means stores compensation data items representing amounts in which the light emitting elements deviate from their respective designed positions in the sub scanning direction. In accordance with the compensation data items stored in the storing means, the image data readout means reads out the image data from those areas of the image data storing means which correspond to the positional deviations of the light emitting elements in the sub scanning direction. The driving means makes the light emitting elements of the optical writing head emit light, in accordance with the image data read out by the image data readout means. The above-described structures enable the optical writing head driving device to optically write on the photoconductor an image in which the positional deviation of the light emitting elements of the optical writing head in the sub scanning direction have been compensated for so that a high quality image, made up of images whose positional deviations have been reduced, can be formed.

In the optical writing head driving device described above, the predetermined areas of the image data storing means are arranged in matrix form along the main scanning direction and the sub scanning direction, and store the image data acquired by the image data acquiring means. In accordance with each of the compensation data items stored in the storing means, the image data readout means reads out the image data from one of the predetermined areas which is separate from a reference line in the sub scanning direction by an amount corresponding to an amount of positional deviation of one of the light emitting elements. Accordingly, the optical writing head driving device can optically write on the photoconductor an image in which the positional deviation of the light emitting elements of the optical writing head in the sub scanning direction have been compensated for, in order to form a high quality image made up of images whose positional deviations have been reduced.

According to the sixth aspect of the present invention having the above object, there is provided an optical writing head driving device for driving an optical writing head which emits light and optically writes information on a photoconductor by illuminating the photoconductor with the light, the optical writing head having light emitting arrays which are arranged along a main scanning direction and each of which includes light emitting elements of a predetermined number, the optical writing head driving device comprising:

image data acquiring means for acquiring image data;

image data storing means having predetermined areas for storing the image data acquired by the image data acquiring means;

storing means for storing compensation data representing approximations to amounts in which the light emitting arrays deviate from designed positions in a sub scanning direction;

image data readout means for reading out the image data from areas of the image data storing means which correspond to positional deviations of the light emitting arrays in the sub scanning direction, in accordance with the compensation data stored in the storing means; and driving means for making the light emitting arrays emit light, in accordance with the image data read out by the image data readout means.

In the above-described optical writing head driving device, the image data acquiring means acquires image data from an external peripheral device. The image data storing means stores, in its predetermined areas, the image data acquired by the image data acquiring means. The storing means stores compensation data representing approximations to the amounts in which the light emitting arrays of the optical writing head deviate from their respective designed positions in the sub scanning direction. In accordance with the compensation data stored in the storing means, the image data readout means reads out the image data from those areas of the image data storing means which correspond to the positional deviations of the light emitting arrays in the sub scanning direction. The driving means makes the light emitting arrays of the optical writing head emit light, in accordance with the image data read out by the image data readout means. The above-described structures enable the optical writing head driving device to optically write on the photoconductor an image in which the positional deviation of the light emitting arrays of the optical writing head in the sub scanning direction have been compensated for so that a high quality image, made up of images whose positional deviations have been reduced, can be formed.

In the optical writing head driving device described above, the optical writing head has first to fifty-sixth light emitting arrays as the light emitting arrays. The storing means derives compensation values $\Delta y_n$, representing approximations to amounts of positional deviations of the first to fourteenth LED arrays, from a formula of $$\Delta y_n = -(I_{1-n}/I_{1-13} \times y_{14})$$

The storing means derives compensation values $\Delta y_n$, representing approximations to amounts of positional deviations of the fifteenth to twenty-eighth light emitting arrays, from a formula of $$\Delta y_n = -y_{14} - \{(I_{14-n}/I_{14-28}) \times (y_{28} - y_{14})\}$$

The storing means derives compensation values $\Delta y_n$, representing approximations to amounts of positional deviations of the twenty-ninth to fourth-second light emitting arrays, from a formula of $$\Delta y_n = -y_{28} - \{(I_{28-n}/I_{28-42}) \times (y_{42} - y_{28})\}$$

The storing means derives compensation values $\Delta y_n$, representing approximations to amounts of positional deviations of the forty-third to fifty-sixth light emitting arrays, from a formula of $$\Delta y_n = -y_{42} - \{(I_{42-n}/I_{42-56}) \times (y_{56} - y_{42})\}$$

where "$y_x$" represents an amount of positional deviation of sampled one of the light emitting arrays, while "I" represents equal intervals between the light emitting arrays.

In the above case, the storing means calculates, using the approximation formulas, the compensation data representing the amounts in which the light emitting arrays deviate from their respective designed positions in the sub scanning direction. The storing means stores the compensation data thus calculated. Hence, the compensation values can be attained without calculating the amounts of deviations of all light emitting arrays.

According to the seventh aspect of the present invention having the above object, there is provided an optical head driving method for driving an optical writing head which emits light and optically writes information on a photoconductor by illuminating the photoconductor with the light, the optical writing head having light emitting elements arranged along a main scanning direction, the optical writing head driving method comprising:

an inputting step of inputting image data;

a timing signal generating step of generating timing signals to compensate for deviations of the light emitting elements from designed positions in a sub scanning direction;

a light emitting step of making the light emitting elements emit light, in accordance with the image data input by the inputting step and in synchronization with the timing signals generated by the timing signal generating step.

According to the optical writing head driving method described above, the image data is input from an external peripheral device by the inputting step. The timing signals to compensate for the deviations of the light emitting elements from their respective designed positions in the sub scanning direction are generated by the timing signal generating step. By the light emitting step, the light emitting elements are made to emit light, in accordance with the image data input by the inputting step and in synchronization with the timing signals generated by the timing signal generating step. With the above-described driving method, the optical writing head can optically write on the photoconductor an image in which the positional deviations of the light emitting elements of the optical writing head in the sub scanning direction have been compensated for so that a high quality image, made up of images whose positional deviations have been reduced, can be formed.

According to the eighth aspect of the present invention having the above object, there is provided an optical writing head driving method for driving an optical writing head which emits light and optically writes information on a photoconductor by illuminating the photoconductor with the light, the optical writing head having light emitting arrays which are arranged along a main scanning direction and each of which includes light emitting elements of a predetermined number, the optical writing head driving method comprising:

an inputting step of inputting image data;

a timing signal generating step of generating timing signals to compensate for deviations of the light emitting arrays from designed positions in a sub scanning direction; and a light emitting step of making light emitting elements of the light emitting arrays emit light, in accordance with the image data input by the inputting step and in synchronization with the timing signals generated by the timing signal generating step.

According to the optical writing head driving method described above, the image data is input from an external peripheral device by the inputting step. The timing signals to compensate for the deviations of the light emitting arrays from their respective designed positions in the sub scanning direction are generated by the timing signal generating step. By the light emitting step, the light emitting elements of the light emitting arrays are made to emit light, in accordance with the image data input by the inputting step and in synchronization with the timing signals generated by the timing signal generating step. With the above-described driving method, the optical writing head can optically write on the photoconductor an image in which the positional deviations of the light emitting elements of the optical writing head in the sub scanning direction have been compensated for so that a high quality image, made up of images whose positional deviations have been reduced, can be formed.

According to the ninth aspect of the present invention having the above object, there is provided an optical writing head driving method for driving an optical writing head which emits light and optically writes information on a photoconductor by illuminating the photoconductor with the light, the optical writing head having light emitting elements arranged along a main scanning direction, the optical writing head driving method comprising:

an inputting step of inputting image data;

an image data storing step of storing, in predetermined areas, the image data input by the inputting step;

an image data readout step of reading out the image data stored by the image data storing step from areas corresponding to positional deviations of the light emitting elements from designed positions in a sub scanning direction, in accordance with compensation data representing amounts of positional deviations of the light emitting elements; and a light emitting step of making the light emitting elements emit light, in accordance with the image data read out by the image data readout step.

According to the optical writing head driving method described above, the image data is input from an external peripheral device by the inputting step. The image data input by the inputting step is stored in predetermined areas. By the image data readout step, the image data stored by the image data storing step is read out from areas corresponding to the positional deviations of the light emitting elements from their respective designed positions in the sub scanning direction, in accordance with the compensation data representing the amounts of positional deviations of the light emitting elements in the sub scanning direction. By the light emitting step, the light emitting elements of the optical writing head are made to emit light, in accordance with the image data read out by the image data readout step. With the above-described driving method, the optical writing head can optically write on the photoconductor an image in which the positional deviations of the light emitting elements of the optical writing head in the sub scanning direction have been compensated for so that a high quality image, made up of images whose positional deviations have been reduced, can be formed.

According to the tenth aspect of the present invention having the above object, there is provided an optical writing head driving device for use in an image forming apparatus which has a first optical writing head including light emitting elements arranged along a main scanning direction, a first photoconductor, a first image forming section for optically writing a reference image on said first photoconductor by illuminating said first photoconductor with light emitted from said first optical writing head, a second optical writing head including light emitting elements arranged along the main scanning direction, a second photoconductor, a second image forming section for optically writing a non-reference image on said second photoconductor by illuminating said second photoconductor with light emitted from said second optical writing head, and transfer means for transferring the images formed by said first and second image forming sections to a transfer medium so that said images are superimposed one on another, said optical writing head driving device comprising:

reference image data acquiring means for acquiring image data representing said reference image;

non-reference image data acquiring means for acquiring image data representing said non-reference image;

image data storing means having predetermined areas for storing the image data acquired by said reference image data acquiring means or the image data acquired by said non-reference image data acquiring means;

storing means for storing compensation data representing amounts in which the light emitting elements of said second optical head deviate in a sub scanning direction from the direction along which the light emitting elements of said first optical writing head are arranged;

image data readout means for reading out image data stored in areas of said image data storing means which correspond to the deviations of the light emitting elements of said second optical writing head, in accordance with the compensation data stored in said storing means; and driving means for making the light emitting elements of said second optical writing head emit light, in accordance with the image data read out by said image data readout means.

BRIEF DESCRIPTION OF THE DRAWINGS

FIG. 20A is a schematic diagram showing the positional deviations of LED array chips;

FIG. 20B is a schematic diagram showing compensation values which have been calculated by approximations and which represents the positional deviations of LED array chips;

DETAILED DESCRIPTION OF THE PREFERRED EMBODIMENT

Embodiments of the present invention will now be described in detail, with reference to the accompanying drawings.

Figure 1:
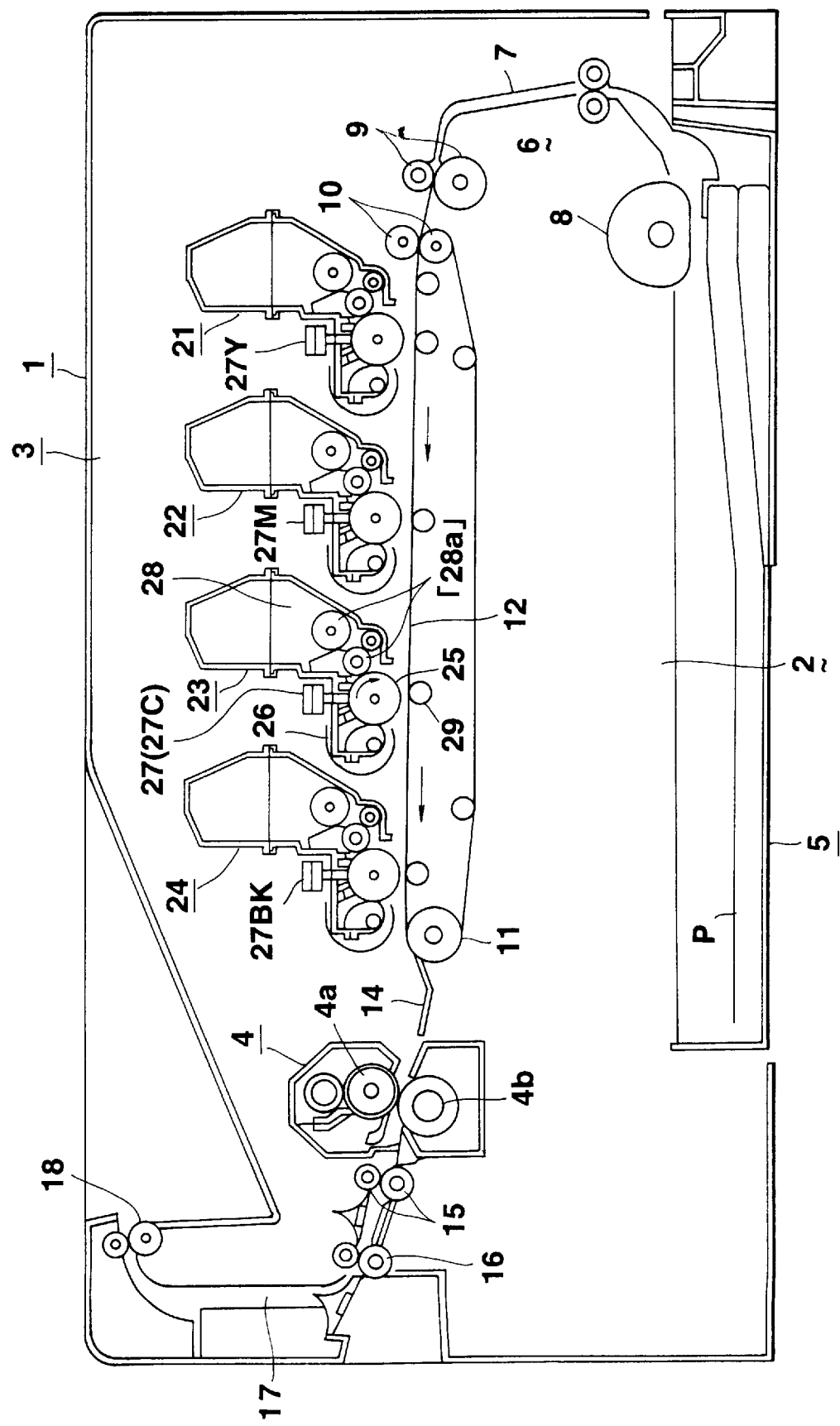
FIG. 1 is a diagram illustrating a sectional view of a color electrophotographic recording apparatus which employs an optical writing head driving device according to the first embodiment of the present invention.

FIG. 1 is a diagram illustrating a sectional view of a color electrophotographic recording apparatus which employs an optical writing head driving device according to the first embodiment of the present invention. This color electrophotographic recording apparatus is what is called a tandem color printer which has image forming units for forming images in a plurality of colors.

The color printer 1 illustrated in FIG. 1 has a sheet feeding/conveying mechanism 2, an image forming section 3 and a fusing section 4.

The sheet feeding/conveying section 2 includes a sheet feeding cassette 5 and a sheet conveying section 6.

The sheet feeding cassette 5 contains sheets of paper P.

The sheet conveying section 6 has a sheet conveyer path 7, a sheet feeding roller 8, standby rollers 9, driving rollers 10 and 11, a conveyer belt 12, a conveyer guide plate 14, conveyer rollers 15 and 16, a sheet discharging guide 17 and a sheet discharging roller 18.

The sheet feeding roller 8 extracts a sheet of paper P from the sheet feeding cassette 5, and sends it to the standby rollers 9 along the sheet conveyer path 7. The standby rollers 9 supply, to the conveyer belt 7 through the driving rollers 10, the sheet of paper P sent along the sheet conveyer path 7. The conveyer belt 12 conveys the sheet of paper P supplied through the driving rollers 10, in time to the image transfer which the image forming section 3 performs. The conveyer belt 12 supplies, to the fusing section 4 through the conveyer guide plate 14, the sheet of paper P to which the image forming section 3 has transferred an image. The fusing section 4 fuses the transferred image to the sheet of paper P, and supplies the paper P to the conveyer rollers 15 and 16. The conveyer rollers 15 and 16 supply the sheet of paper P to the sheet discharging roller 18 through the sheet discharging guide 17. The sheet discharging roller 18 sends the sheet of paper P to the outside of the recording apparatus.

The image forming section 3 includes four image forming units 21 to 24 for forming images in yellow (Y), magenta (M), cyan (C) and black (BK).

Each of the image forming units 21 to 24 has a photosensitive drum 25, a charger 26, an LED head 27, a developer 28 and a transfer roller 29.

The circumferential surface portion of the photosensitive drum 25 is formed of an organic photoconductive material or the like, and an electrostatic latent image is formed thereon by the LED light emitted from the LED head 27. The charger 26 charges the photosensitive drum 25 with electricity having a predetermined polarity. The developer 28 contains toner colored in yellow (M), magenta (M), cyan (C) or black (BK), and supplies the toner to the photosensitive drum 25 via a developer roller 28a so that the toner adheres to the electrostatic latent image formed on the photosensitive drum 25. The transfer roller 29 transfers the toner image adhering to the photosensitive drum 25 to the paper P on the conveyer belt 12.

Figure 2:
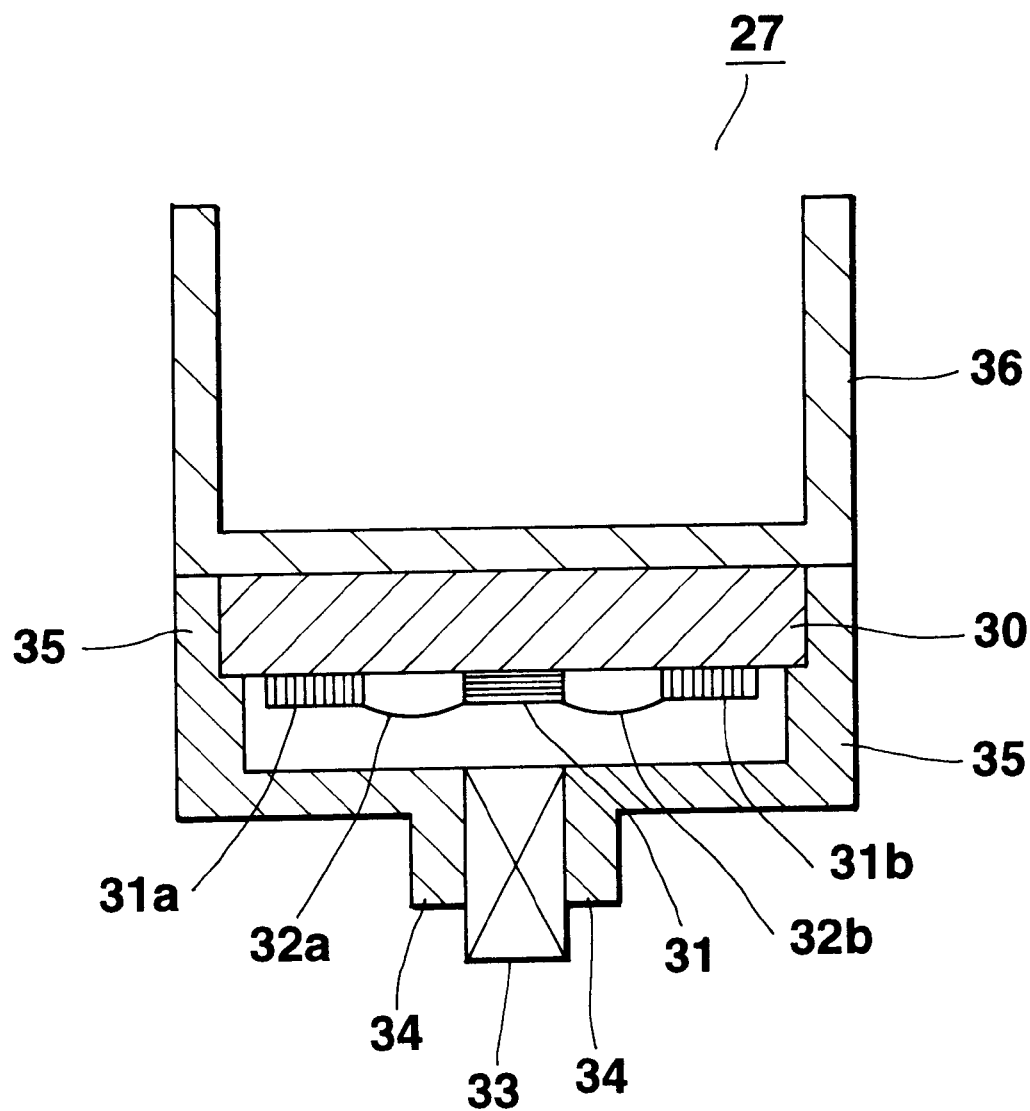
FIG. 2 is a diagram illustrating a sectional view of an LED head according to the first embodiment of the present invention.

The LED head 27 (27Y to 27BK) illuminates the photosensitive drum 25 with the LED light, thus performing optical writing. FIG. 2 is a diagram showing a cross section of the LED head 27. The LED head 27 includes an LED array substrate 30, LED array chips 31, drive ICs 31a and 31b, bonding wires 32a and 32b, a lens array 33, a lens holder 34, a substrate holder 35 and a case 36.

Each of the LED array chips 31 has a plurality of LEDs. The LED head 27 numbers 3584 LEDs, which are arranged in a row along the main scanning direction or the direction of the print width. The LED array chips 31 emit light in accordance with drive signals supplied from the drive ICs 31a and 31b through the bonding wires 32a and 32b. The LED array chips 31, the drive ICs 31a, 31b and the bonding wires 32a, 32b are arranged on the LED array substrate 30. The lens array 33 is a convergent photoconductor array or the like, and adjusts the light emitted from the LED array chips 31 so that the light illuminates the photosensitive drum 25. The lens holder 34 holds the lens array 33. The substrate holder 35 holds the LED array substrate 30. The lens holder 34 and the substrate holder 35 are formed in integration with each other, and are supported by the case 36.

Using three image forming units 21 to 23 for yellow, magenta (M) and cyan (C), the image forming section 3 form a color image by the subtractive mixture of colors. For example, in the case of forming a blue image, the image forming section 3 transfers the magenta (M) toner from the image firming unit 22 to a given area on a sheet of paper P, and thereafter transfers the cyan (C) toner from the image forming unit 23 to the given area on the sheet of paper P. In the case of forming a read image, the image forming section 3 transfers the yellow (Y) toner from the image forming unit 21 to a specific area on a sheet of paper P, and thereafter transfers the magenta (M) toner from the image forming unit 22 to the specific area on the sheet of paper P.

With the image forming unit 24 for black (BK), the image forming section 3 forms a monochrome image serving as a positional reference. The image forming section 3 can form a black (BK) image also with the image forming units 21 to 23. However, the processing of forming a black image with the image forming unit 24 for black (BK) is faster than the processing of forming a black image with the image forming units 21 to 23. Further, using the image forming unit 24 for black (BK) ensures a monochrome color which is more exact than in the case of using the image forming units 21 to 23.

The fusing section 4 has a heat roller 4a and a press roller 4b. The heat roller 4a melts the toner images transferred by the image forming units 21 to 24. The press roller 4 fixes the toner images melted by the heat roller 4a to the paper P.

Figure 3:
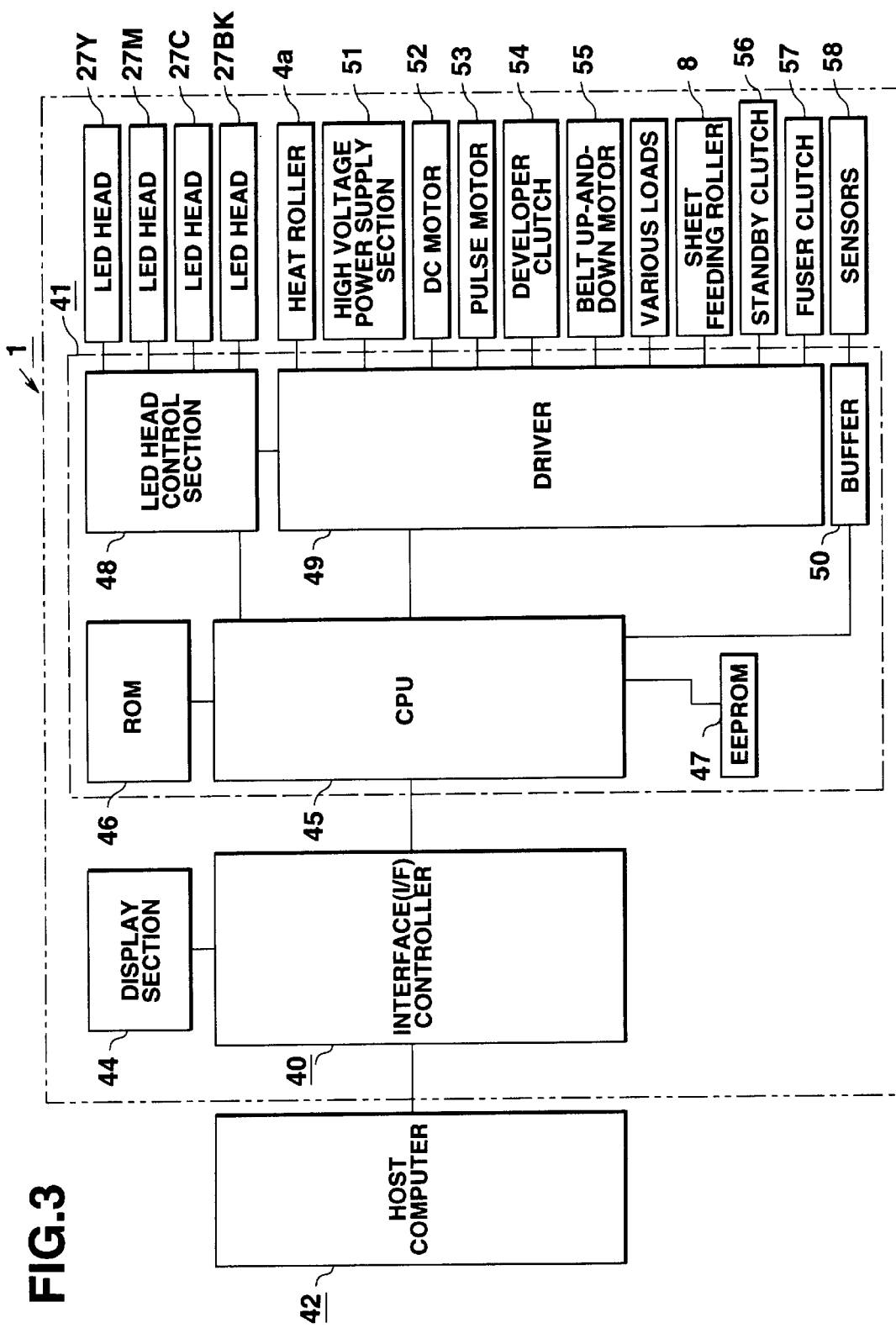
FIG. 3 is a block diagram illustrating a control circuit used in the color electrophotographic recording apparatus which employs the optical writing head driving device according to the first embodiment of the present invention.

FIG. 3 is a block diagram showing the control circuit of the color printer 1. The color printer 1 has an interface controller 40 and a printer controller 41.

The interface controller 40 generates bit map data as an image to be printed, and supplies the data to the printer controller 41. The interface controller 40 displays various information on a display section 44 connected to the interface controller 40.

The printer controller 41 has a CPU 45, a ROM 46, an EEPROM 47, an LED head control section 48, a driver 49 and a buffer 50.

The ROM 46 prestores programs for controlling the whole parts of the printer 1. The CPU 45 executes those programs.

The EEPROM 47 prestores compensation data representing the positional deviations of the LED array chips 31 of the LED heads 27Y to 27BK.

The CPU 45 controls the LED head control section 48 and the driver 49 so as to generate image data corresponding to the bit map data sent from the printer controller 41. That is, the CPU 45 controls the LED head control section 48 in accordance with the compensation data stored in the EEPROM 47 so that the LED heads 27Y to 27BK emit LED light in consideration of the positional deviations of the LED array chips 31. Further, the CPU 45 controls the driver 49 so as to transfer and fuse the toner images to paper P.

The LED head control section 48 controls the LED heads 27Y to 27BK so as to emit the LED light.

The driver 49 controls the heat roller 4a, a high voltage power supply section 51, a DC motor 52, a pulse motor 53, a developer clutch 54, a belt up-and-down motor 55, a standby clutch 56 and a fuser clutch 57. The high voltage power supply section 51 applies a predetermined high voltage to the chargers 26 and the transfer rollers 29. The DC motor 52 and the pulse motor 53 rotate the photosensitive drums 25 and various rollers. The developer clutch 54 transmits the rotational force of the DC motor 52 to the developer rollers 28a provided in the developers 28 of the image forming units 21 to 24. The belt up-and-down motor 55 drives the conveyer belt 12 upward and downward, thereby performing switching between the monochrome print and the color print. The standby clutch 56 transmits the rotational force of the pulse motor 53 to the standby rollers 9. The fuser clutch 57 transmits the rotational force of the DC motor 52 to the fuser roller 4*a*.

The buffer 50 receives various measurement information sent from each of sensors 58, and supplies the received measurement information to the CPU 45. Each sensor 58 has a sensor which senses the position of paper P and a sensor which detects the temperature of the LED head 27, etc.

Figure 4:
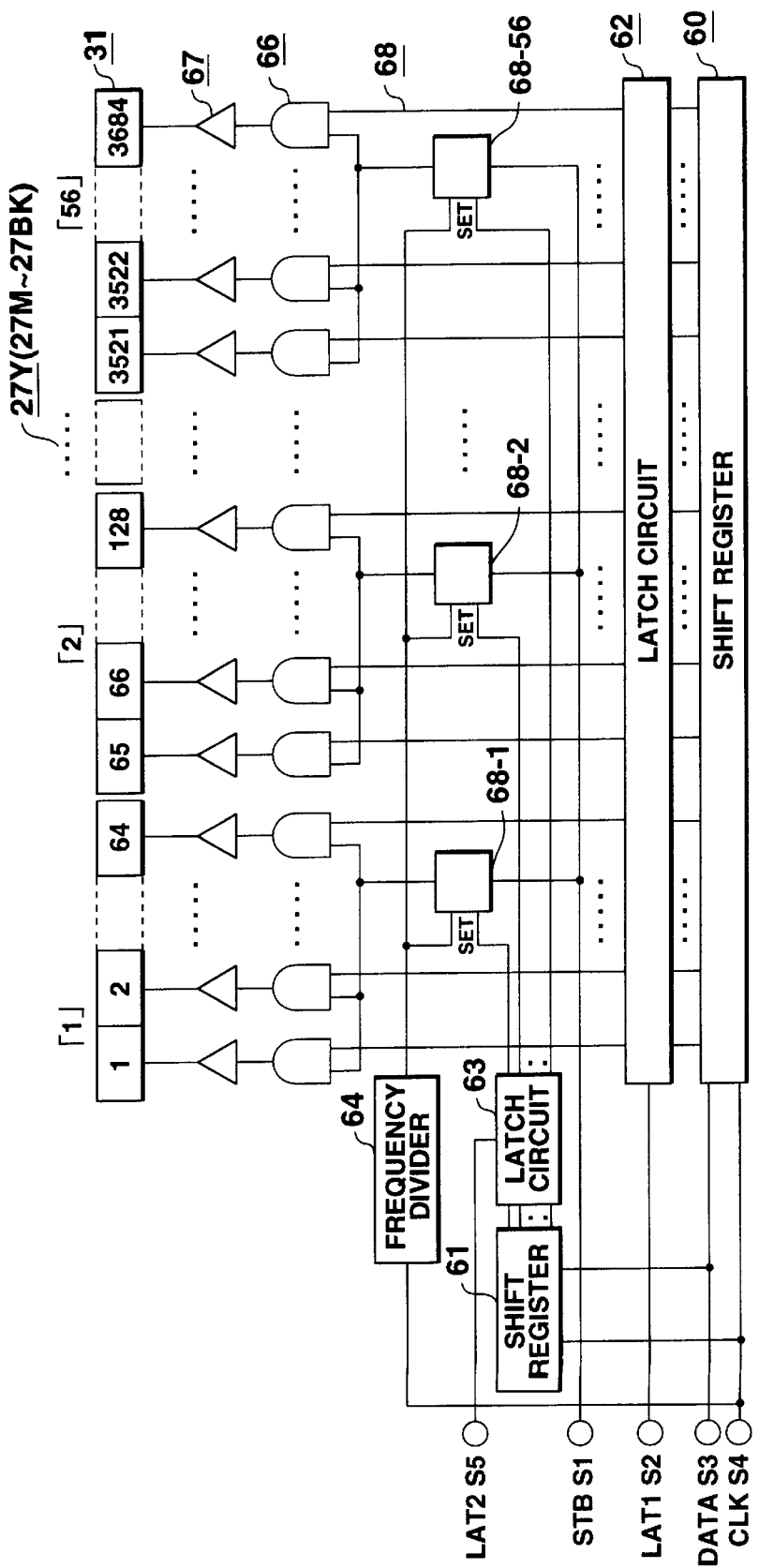
FIG. 4 is a diagram illustrating the circuitry of an optical writing head according to the first embodiment of the present invention.

FIG. 4 is a circuit diagram illustrating the LED head 27 (27Y to 27BK). The LED head 27 includes LED array chips 31, shift registers 60 and 61, latch circuits 62 and 63, a frequency divider 64, an AND gate 66, a buffer 67 and a delay circuit section 68.

The LED head 27 has 56 LED array chips 31, each of which includes 64 LEDs. The LED head 27 numbers 3584 LEDs, which are arranged in a row along the main scanning direction or the direction of the print width.

Each of the shift registers 60 and 61 is a serial-in/parallel-out register having areas for storing 3584 data items corresponding in number to the LEDs of the LED array chips 31. Bit map data (DATA) sent from the LED head control section 48 is sequentially input to the shift register 60 in synchronization with a clock signal (CLK) sent from the LED head control section 48, and the shift register 60 outputs the bit map data formed of 3584 data items to the latch circuit 62. Similarly, the bit map data (DATA) is sequentially input to the shift register 61 in synchronization with the clock signal (CLK), and the shift register 61 outputs the bit map data to the latch circuit 63.

In accordance with a latch signal (LAT1) sent from the LED head control section 48, the latch circuit 62 outputs to the AND gate 66 the bit map data sent from the shift register 60. In accordance with a latch signal (LAT2) sent from the LED head control section 48, the latch circuit 63 outputs to the delay circuit section 68 the bit map data sent from the shift register 61.

The frequency divider 64 frequency-divides the clock signal (CLK) sent from the LED head control section 48 at a predetermined ratio, and outputs the frequency-divided signal to the delay circuit section 68.

The AND gate 66 has 3584 AND circuits corresponding in number to the LEDs of the LED array chips 31. The AND circuits are divided into 56 groups. The number of AND circuits forming each group is 64, as well as the number of LEDs forming each of the LED array chips 31. The AND circuits of each group receive the same delay signal from the delay circuit section 68, generate drive signals each being the logical product of the bit map data sent from the latch circuit 62 and the aforementioned delay signal, and output the drive signals to a corresponding one of the LED array chips 31 through the buffer 67.

The buffer 67 has 3584 buffer circuits corresponding in number to the whole LEDs of the LED array chips 31, and outputs the drive signals to the LED array chips 31.

The delay circuit section 68 includes delay circuits 68-1 to 68-56. The number of delay circuits is 56, which is equal to the number of groups forming the AND gate 66. The delay circuits 68-1 to 68-56 delay strobe signals (STB) sent from the LED head control section 48, and output the delayed signals to their corresponding groups of AND circuits forming the AND gate 66. Utilizing the shift register 61 and the latch circuit 63, the delay circuit 68-1 to 68-56 attain delay times according to the compensation data stored in the EEPROM 47, delay the strobe signals (STB) and output the delayed signals to their corresponding groups of AND circuits forming the AND gate 66. The compensation data stored in the EEPROM 47 represents the positional deviations of the LED array chips 31. Hence, the delay times for the delay circuit 68-1 to 68-56 differ according to the positional deviations of the LED array chips 31.

Figure 5:
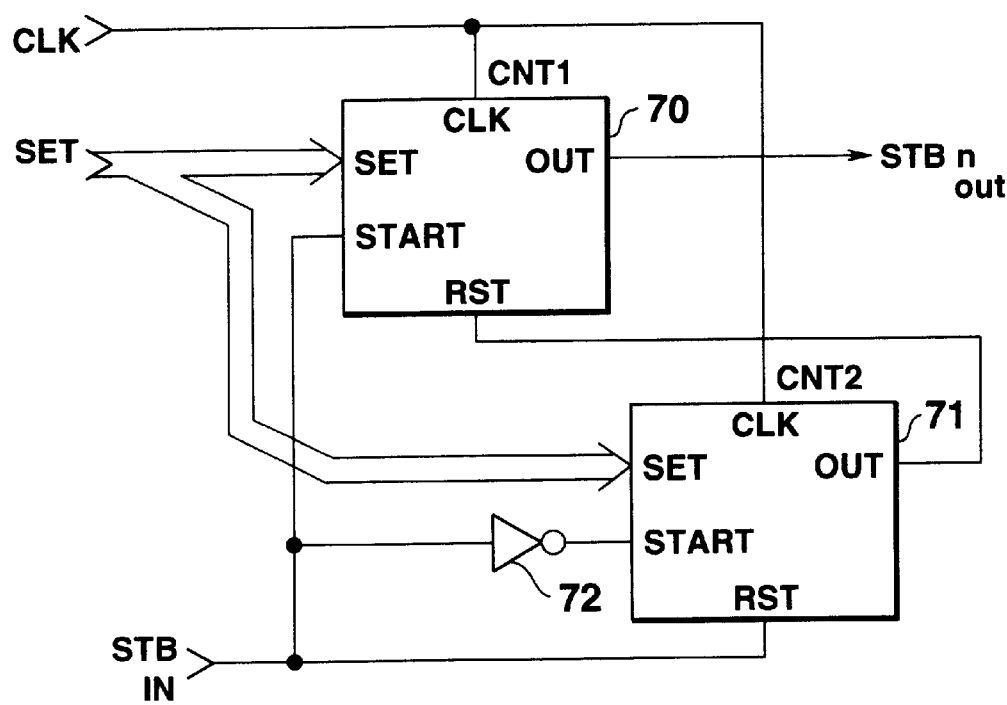
FIG. 5 is a diagram illustrating a delay circuit included in the optical writing head according to the first embodiment of the present invention.

FIG. 5 is a detailed circuit diagram illustrating one of the delay circuits 68-1 to 68-56. Each delay circuit includes 8-bit subtraction counters 70, 71 and an inverter 72.

A compensation value (DATA) is input from the shift register 61 to the SET terminals of the subtraction counters 70 and 71 through the latch circuit 63 such that the compensation value is set in the subtraction counters 70 and 71. The frequency-divided clock signal (CLK) sent from the frequency divider 64 is input to the CLK terminals of the subtraction counters 70 and 71, and the subtraction counters 70 and 71 count the input clock signal. The subtraction counters 70 and 71 are cascade-connected to each other. That is, a signal which has been output from the OUT terminal of the subtraction counter 71 is input to the RST terminal of the subtraction counter 70.

When a strobe signal (STB) is input to the START terminal of the subtraction counter 70, the counter 70 starts counting the clock signal (CLK) input to the CLK terminal. Each time the subtraction counter 70 counts the clock signal (CLK), the counter 70 subtracts "1" from the set compensation value. When the compensation value becomes "0" as a result of the subtraction, the subtraction counter 70 outputs a strobe signal (STBn) from its OUT terminal (sets the strobe signal at a high level).

When the strobe signal (STB) is input to the START terminal of the subtraction counter 71 through the inverter 72, the counter 71 starts counting the clock signal (CLK) input to the CLK terminal. Each time the subtraction counter 71 counts the clock signal (CLK), the counter 71 subtracts "1" from the set compensation value. When the compensation value becomes "0", the subtraction counter 71 outputs a signal from its OUT terminal to the RST terminal of the subtraction counter 70.

Thus, using the subtraction counters 70 and 71, each of the delay circuits 68-1 to 68-56 delays a strobe signal (STB) sent from the LED head control section 48 for the delay time according to the set compensation value, and outputs the delayed strobe signal (STBn) to a corresponding one of the groups of AND circuits forming the AND gate 66.

The optical writing head driving process carried out by the optical writing head driving device of the first embodiment of the present invention will now be described with reference to the drawings.

First of all, the compensation values set in the delay circuit section 68 will be explained. The compensation values set in the delay circuit section 68 represent the positional deviations of the LED array chips 31. The positional deviations of the LED array chips 31 were measured supplying a drive signal to each LED and actually making each LED emit light after the manufacture of the LED heads. In order to measure the positional deviations of the LED array chips 31, the LEDs of the LED array chips 31 were made to emit light and the positions of light spots were accurately detected using an image pickup device such as a CCD sensor or the like.

Figure 6:
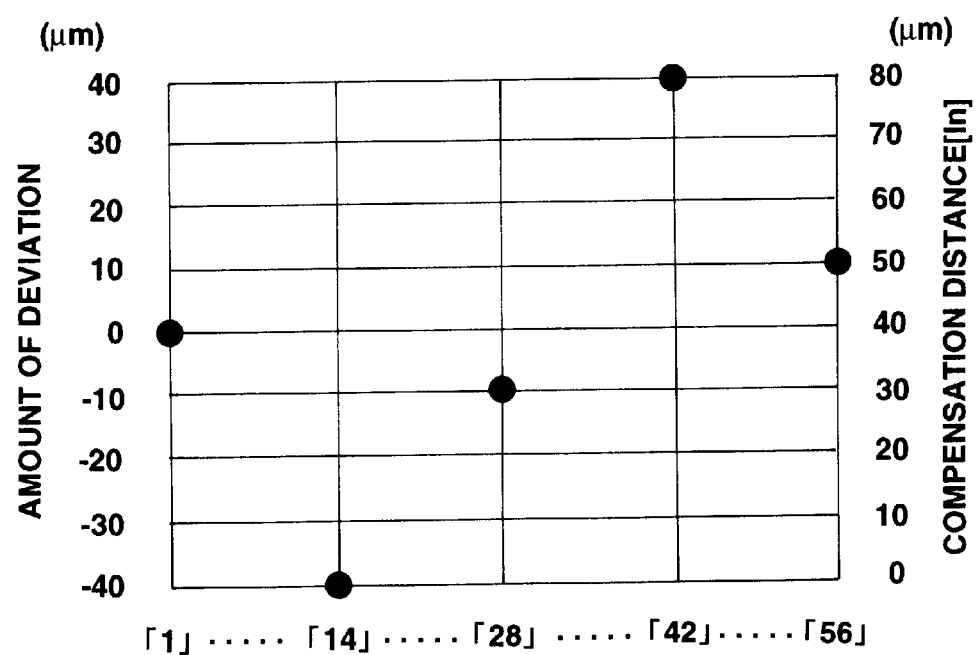
FIG. 6 is a diagram showing the result of the measurements of the positions of the spots formed by the light emitted from LEDs included in the optical writing head according to the first embodiment of the present invention.
Figure 7:
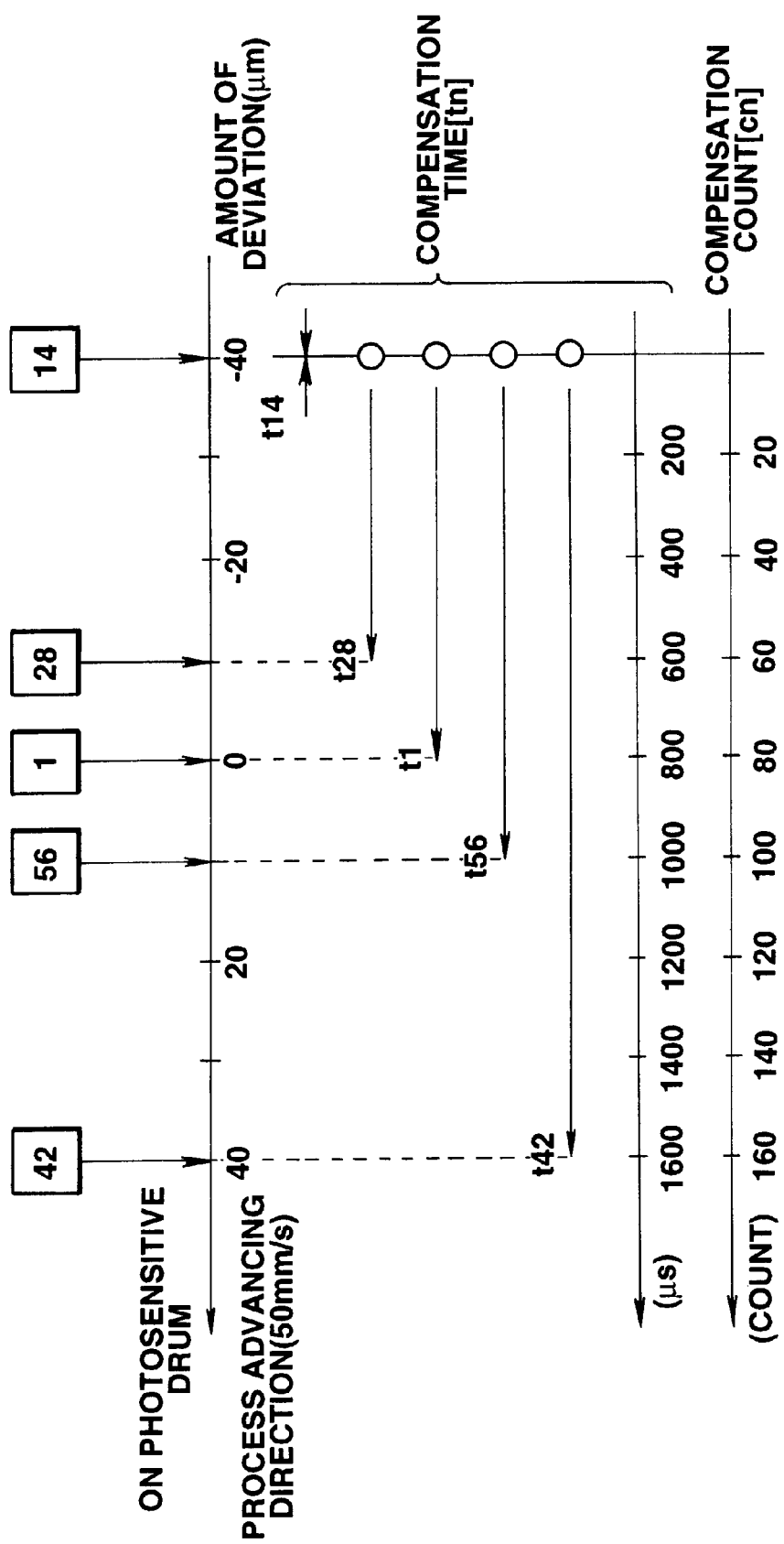
FIG. 7 is a diagram showing the relationship between the amount of positional deviation of an LED and a compensation value.

The positional deviations of the LED array chips 31 will now be explained with reference to FIGS. 6 and 7. FIG. 6 is a diagram showing the result of the measurements in which the LEDs of the LED array chips 31 were made to emit light and the positions of the spots formed by the light emitted from the LEDs were detected using a non-illustrated CCD image pickup device. FIG. 7 is a diagram showing the relationship between the amount of positional deviation of each LED and a compensation value.

Let it be assumed that the process speed or the sheet conveying speed of the printer 1 is 50 mm/s and the frequency of the clock signal (CLK) is 10 MHz, for example. The frequency divider 64 frequency-divides the clock signal (CLK) at a ratio of 1/100, and generates a frequency-divided clock signal of 0.1 MHz (10 μs/clock). The process moving distance per clock of the frequency-divided clock signal, generated by the frequency divider 64, is 0.5 μm/clock. Since the delay circuit section 68 has the 8-bit subtraction counters 70 and 71, it is able to count 256 clocks at most and perform a position control of 128 μm at most.

The amounts of positional deviations of the spots, formed by the light emitted from the LED array chips 31, are those derived based on the position of the spot formed by the light emitted from LED array chip No. [1] of the LED array chips 31. The amount of positional deviation of the spot formed by the light emitted from LED array chip No. [14] of the LED array chips 31 is −40 μm. The amount of positional deviation of the spot formed by the light emitted from LED array chip No. [28] is −10 μm. The amount of positional deviation of the spot formed by the light emitted from LED array chip No. [42] is +40 μm. The amount of positional deviation of the spot formed by the light emitted from LED array chip No. [56] is +10 μm.

The compensation distance of each LED array chip 31 is determined based on that one of the LED array chips 31 whose light spot deviation amount in the "−" direction is greatest. Of the LED array chips 31, the LED array chip whose light spot deviation amount in the "−" direction is greatest in FIG. 6 is chip No. [14]. The compensation distance of the LED array chip No. [14] is 0, on the basis of which the compensation distances of the other LED array chips 31 are determined. Specifically, in FIG. 6, the compensation distance "In" of LED array chip No. [1] is +40 μm, the compensation distance "In" of LED array chip No. [28] is +30 μm, the compensation distance "In" of LED array chip No. [42] is +80 μm, and the compensation distance "In" of LED array chip No. [56] is +50 μm.

Based on the compensation distances thus determined, the compensation time of each LED array chip 31 is calculated using the following formula:

$$tn\ [\mu s]=(1/Vp\ [mm/s])\times In\ [\mu m]\times 1000$$

tn: Compensation time
Vp: Process speed
In: Compensation distance

That is, the compensation time (tn) of each LED array chip 31 is as follows:
LED array chip No. [1]: t1=800 [μs]
LED array chip No. [14]: t14=0 [μm]
LED array chip No. [28]: t28=600 [μm]
LED array chip No. [42]: t42=1600 [μm]
LED array chip No. [56]: t56=1000 [μm]

Based on the compensation times thus calculated, the compensation value of each LED array chip 31 is calculated using the following formula:

$$Cn\ [count]=tn\ [\mu m]\times 0.1\ [MHz]$$

Cn: compensation value
tn: compensation time

That is, the compensation value (Cn) of each LED array chip 31 is as follows:
Compensation value of LED array chip No. [1]: C1=80 [counts]
Compensation value of LED array chip No. [14]: C14=0 [counts]
Compensation value of LED array chip No. [28]: C28=60 [counts]
Compensation value of LED array chip No. [42]: C42=160 [counts]
Compensation value of LED array chip No. [56]: C56=100 [counts]

The above-described amounts of positional deviations of the light spots, the compensation times and the compensation counts have the relationship shown in FIG. 7.

The compensation value of each LED array chip 31 which has been derived in the above-described manner is stored in advance in the EEPROM 47, and is set in the corresponding delay circuit of the delay circuit section 68 at the time of driving the optical writing heads. For example, the compensation value "80" (C1=80 [counts]) of LED array chip No. [1] of the LED array chips 31 is set in the delay circuit 68-1.

The image forming process, carried out by the optical writing head driving device under the condition wherein the compensation values have been set in the delay circuits of the delay circuit section 68, will be described next.

Print data output from a host computer 42 is supplied to the interface controller 40. The interface controller 40 converts the received print data to bit map data, and supplies the bit map data to the printer controller 41. The printer controller 41 generates control data corresponding to the received bit map data, and supplies the control data to the LED head control section 48, together with the bit map data. The LED head control section 48 supplies the bit map data to the LED heads 27Y to 27BK in accordance with the received control data.

The LED heads 27Y to 27BK sequentially acquire the bit map data from the LED head control section 48, in synchronization with the clock signal (CLK). The shift register 60 outputs the bit map data formed of 3584 data items to the latch circuit 62. In accordance with the latch signal (LAT1) sent from the LED head control section 48, the latch circuit 62 outputs to the AND gate 66 the bit map data sent from the shift register 60.

The compensation values representing the positional deviations of the LED array chips 31 have been preset in the delay circuits (68-1 to 68-56) of the delay circuit section 68. Each delay circuit delays the strobe signal (STB) sent from the LED head control section 48 for the delay time according to the compensation value preset therein, and outputs the delayed strobe signal (STBn) to a corresponding one of the groups of the AND circuits forming the AND gate 66.

Each AND circuit of the AND gate 66 generates the drive signal which is the logical product of the bit map data sent from the latch circuit 62 and the strobe signal (STBn) sent from the delay circuit section 68, and outputs the drive signal to a corresponding one of the LED array chips 31 through the buffer 67.

Each LED array chip 31 makes its own LEDs emit light at the proper timing according to its own positional deviation, thereby reducing the positional deviation of an image when formed.

Figure 8:
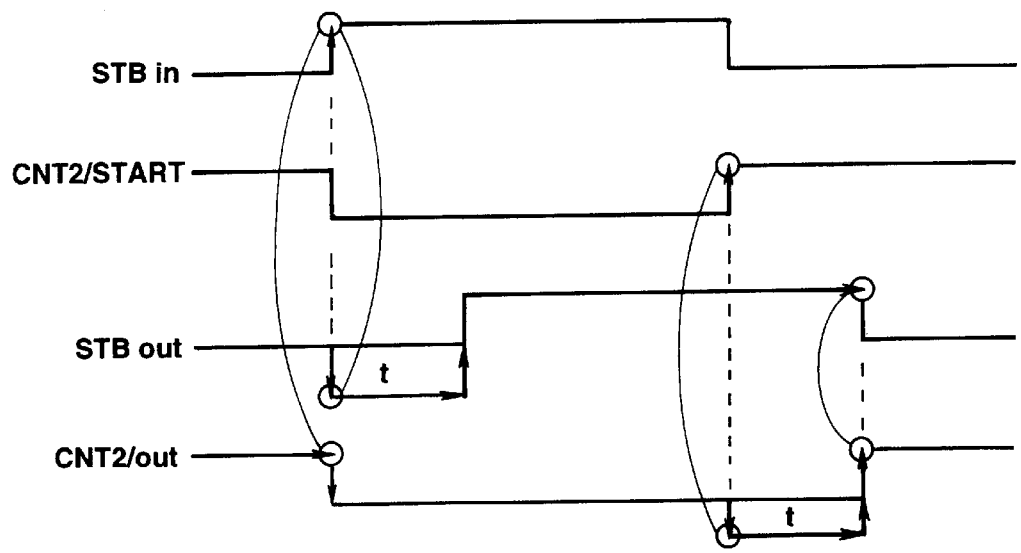
FIG. 8 is a timing chart explaining the delay caused by a delay circuit included in the optical writing head according to the first embodiment of the present invention.

FIG. 8 is a timing chart explaining the delay caused by the delay circuit section 68. The delay circuit section 68 receives the strobe signal (STB in) sent from the LED head control section 48, and outputs the strobe signal (STB out) delayed for the time "t" which has been set as a compensation value. For example, the time "t" which has been set in the delay circuit 68-1 as a compensation value is "80", and accordingly the delay circuit 68-1 outputs the strobe signal (STB out) delayed for 800 μs.

Figure 9:
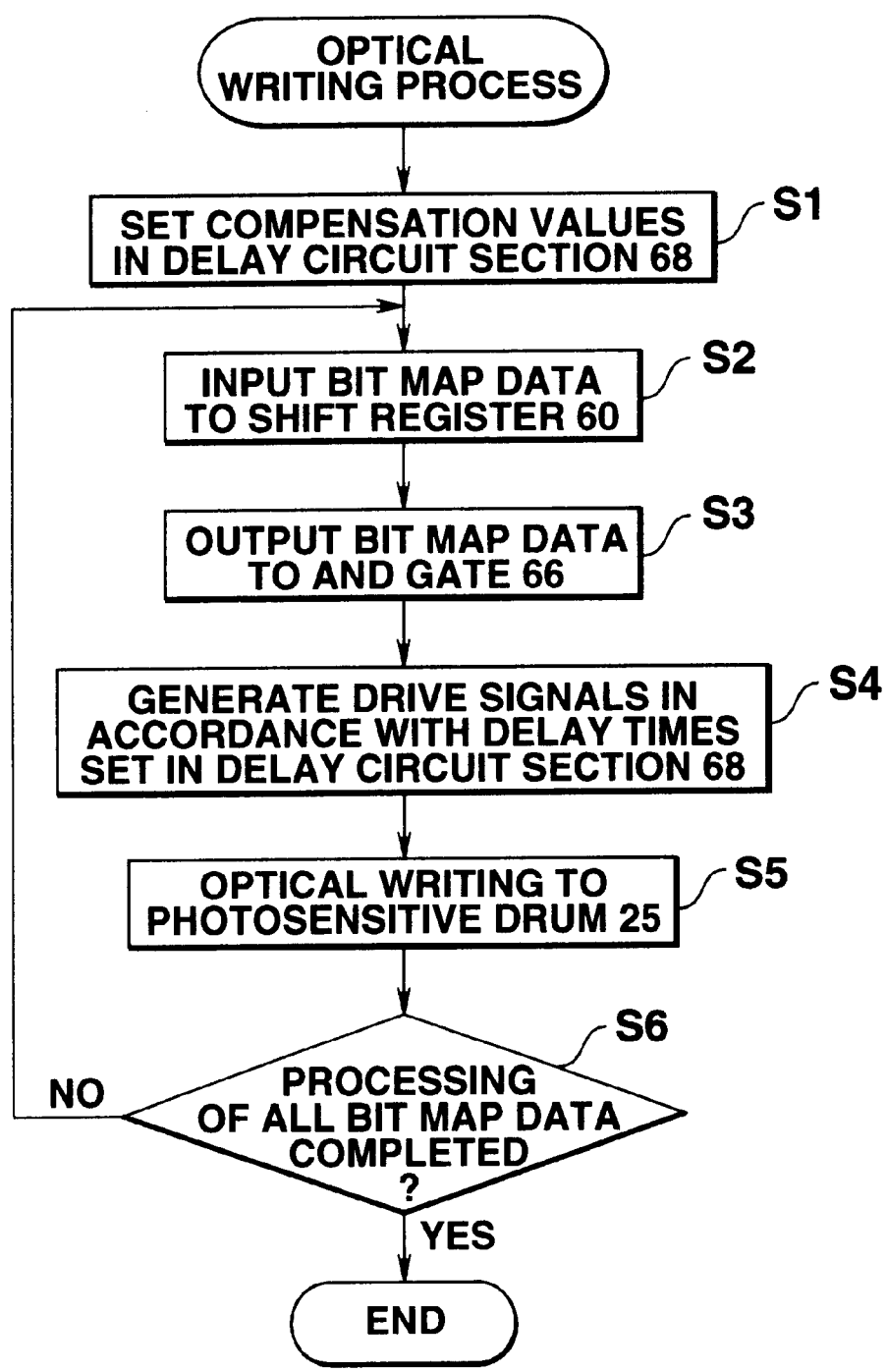
FIG. 9 is a flowchart showing an optical writing head driving process according to the first embodiment of the present invention.
Figure 10:
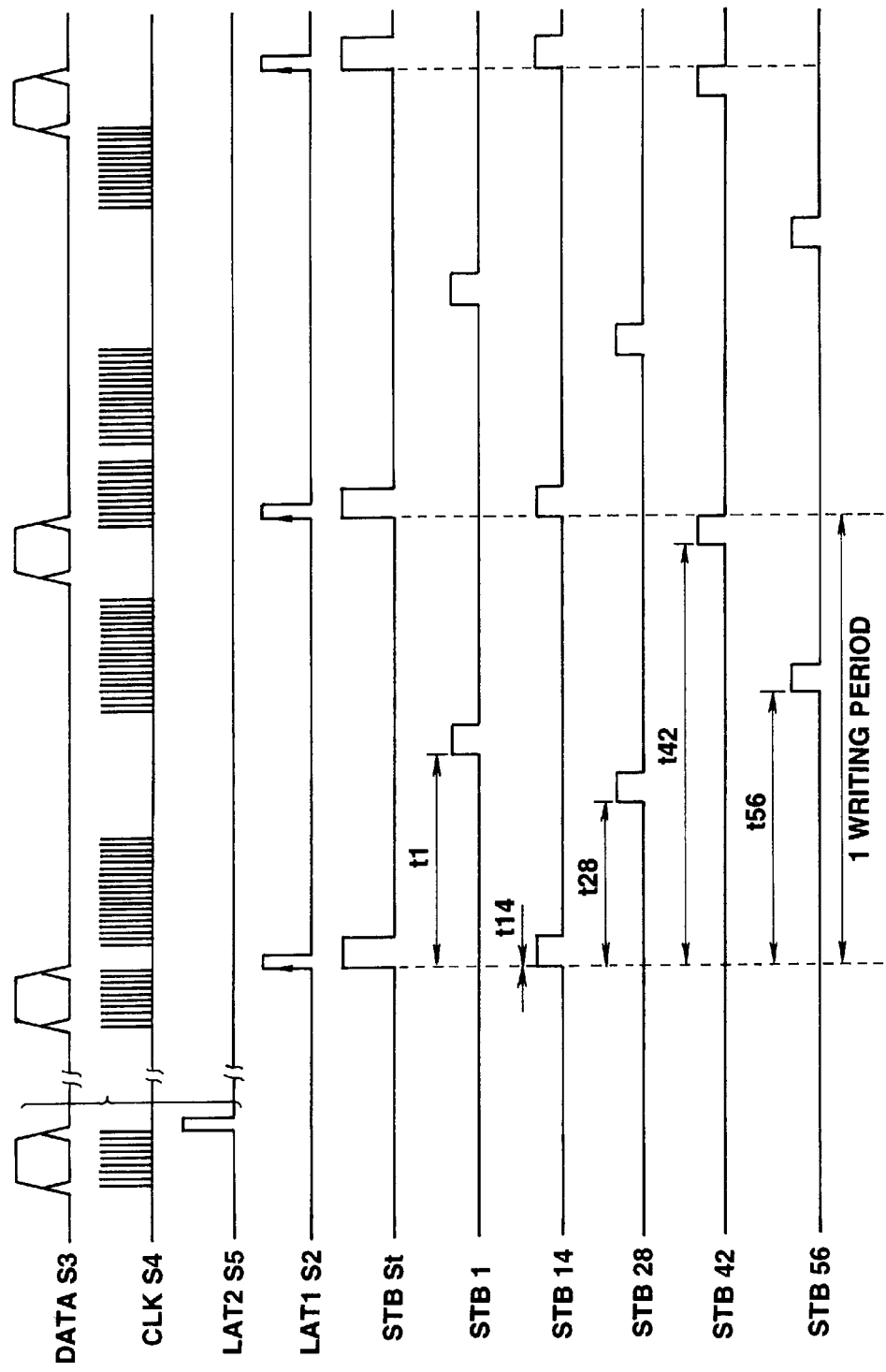
FIG. 10 is a timing chart showing the entire processing timing of the optical writing head driving device according to the first embodiment of the present invention.

The optical writing head driving process will now be described with reference to FIGS. 9 and 10. FIG. 9 is a flowchart showing the optical writing head driving process carried out by the optical writing head driving device. FIG. 10 is a timing chart showing the entire processing timing of the optical writing head driving device at the time of carrying out the optical writing head driving process.

First, when the power is turned on, for example, the printer controller 41 causes the LED head control section 48 to set, in the delay circuit section 68 of each LED head 27, the compensation values stored in the EEPROM 47. More specifically, at the timing indicated by the reference character "I" in FIG. 10, the LED head control section 48 sequentially supplies the shift register 61 of each LED head 27 with the compensation values (DATA) sent from the printer controller 41 so that the compensation values are set in the delay circuit section 68 of each LED head 27 via the latch circuit 63 (step S1).

After the compensation values have been set in the delay circuit section 68 of each LED head 27, the LED head control section 48 sequentially supplies the shift register 60 of each LED head 27 with the bit map data (DATA) sent from the printer controller 41. The shift register 60 sequentially acquires the bit map data from the printer controller 41 (step S2). The shift register 60 outputs the acquired bit map data to the latch circuit 62 in a parallel fashion. The latch circuit 62 latches the bit map data in synchronization with the latch signal (LAT1), and output the latched bit map data to the AND gate 66 (step S3).

Each AND circuit of the AND gate 66 generates the drive signal which is the logical product of the strobe signal (STBn) sent from the delay circuit section 68 and the data sent from the latch circuit 62, and supplies the drive signal to a corresponding one of the LED array chips 31 through the buffer 67 (step S4).

Each LED array chip 31 makes its own LEDs emit light in accordance with the drive signal, thus performing the optical writing to the photosensitive drum 25 (step S5).

The LED head control section 48 determines whether the processing of all bit map data has been completed (step S6). When the LED head control section 48 determines that the processing of all bit map data has not yet been completed, it repeats the steps S2 to S5.

For example, the AND gate 66 supplies the strobe signal (STB1) to LED array chip No. [1] of the LED array chips 31 through the buffer 67. This strobe signal (STB1) is one generated by delaying the strobe signal sent from the LED head control section 48 for the delay time "t1", as seen from FIG. 10. The delay time "t1" is the time necessary for the photosensitive drum 25 to move 40 μm from a reference position. In accordance with the drive signal which is the logical product of the bit map data and the strobe signal (STB1), an electrostatic latent image free from a positional deviation is formed on the photosensitive drum 25. Toner is adhered to the electrostatic latent image, and the image bearing the toner is transferred to a sheet of paper P and is printed thereon. The printed image is one in which the positional deviations of the LED array chips 31 have been compensated for.

According to the optical writing head driving device of the first embodiment of the present invention, as described above, the positional deviations of the LED array chips 31 are compensated for such that an image is printed in the accurate position on a sheet of paper P. According to the optical writing head driving device of the first embodiment of the present invention, since the compensation can be easily achieved using the delayed strobe signals, the time required for manufacturing the optical writing heads can be reduced. Since the precision with which the optical writing heads are manufactured can be set lower than conventionally, the manufacturing yield can be improved.

In the first embodiment, the delay circuits of the delay circuit section 68 are provided each for a corresponding one of the LED array chips 31, and the deviation compensation is effected chip by chip. However, the delay circuits may be provided each for a corresponding one of the LEDs, and the deviation compensation may be effected LED by LED. In this case, the positional deviation of each LED in the sub scanning direction is compensated for so that images can be printed in the accurate positions on a sheet of paper P.

The optical writing head driving device of the first embodiment is not limited to the circuitry specified above. In the first embodiment, for example, the compensation values measured in advance are stored in the EEPROM 47. However, the compensation values may be stored in any other storage means. Moreover, in the first embodiment, the driving means includes the CPU 45 and the LED head control section 48, while the drive timing control means includes the delay circuitries 68. However, the structures of the driving means and the drive timing control means are not limited to those described above, and any other structures may be adopted. Furthermore, the driving process carried out by the driving means and the drive timing control process carried out by the drive timing control means may be realized by programs.

In the first embodiment, the positional deviations of the LED chips 31 are compensated for in order to improve the degree of the straightforwardness. However, the deviations of the optical writing heads of the image forming units from their respective designed positions may be compensated for.

The optical writing head driving process performed by the optical writing head driving device of the second embodiment of the present invention, which can compensate for the deviations of the optical writing heads from their respective designed positions, will now be described with reference to the drawings.

The phenomenon wherein the images optically written by the optical writing heads of tandem image forming units do not exactly overlap each other when printed on a sheet of paper, occurs mainly for the following three causes:

The first cause is that the LED heads of the image forming units deviate in the sub scanning direction (Y-direction) from their respective designed positions. The second cause is the "θ-directional deviation" (one end and the other end of the arrangement of the LEDs differ from each other in the amount of deviation in the sub scanning direction). The third cause is that the rotational speeds of the photosensitive drums differ from each other or a speed variation occurs in the conveyor system such as the conveyor belt.

The compensation values employed in the case of the first cause will now be explained.

Figure 11A:
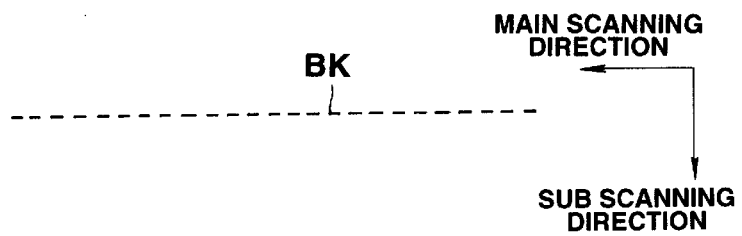
FIG. 11A is a diagram illustrating a line image which serves as a reference image.

FIG. 11A illustrates a line image or a reference image BK. The reference image BK is a discontinuous line image formed by the LED head 27BK of the image forming unit 24, and extends straight along the main scanning direction. Using the reference image BK as a test chart, the amount of deviation of each of the non-reference images formed by the LED heads 27Y to 27C of the other image forming units 21 to 23 is measured.

Figure 11B:
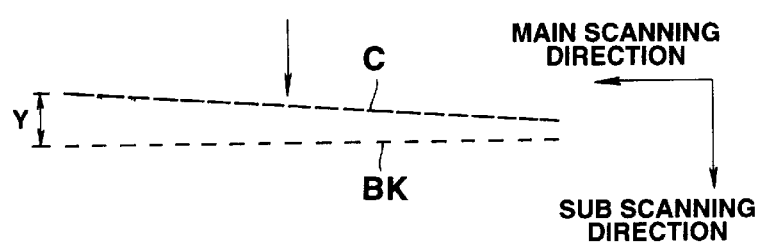
FIG. 11B is a diagram illustrating an image which has been formed by the optical writing head and which deviates from the reference image.

Let it be assumed that the LED head 27C has formed an image (hereinafter referred to as the non-reference image C) deviating from the reference image BK in the sub scanning direction as seen in FIG. 11B, although the LED head 27C was to form an image coincident with the reference image BK. This matter suggests that the LED head 27C extends deviating from a direction in which the LED head 27BK extends. The amount of deviation of the non-reference image C from the reference image BK in the sub scanning direction is measured, a compensation value representing the amount of deviation is calculated, and the calculated compensation value is stored in the EEPROM 47 in advance. The LED head 27C makes the LEDs of the LED chips 31 emit light in accordance with the set compensation value, thus forming an image in consideration of the deviation from the LED head 27BK.

Similarly, as regards the non-reference images formed by the other LED heads 27Y and 27M, the amount of deviation from the reference image BK is measured, a compensation value representing the amount of deviation is calculated, and light is emitted from the LEDs in accordance with the compensation value, thus forming an image in consideration of the deviation from the LED head 27BK.

The compensation values employed in the case of the second cause will now be explained.

Figure 12A:
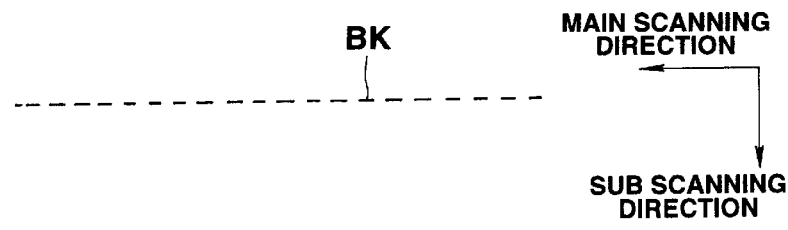
FIG. 12A is a diagram illustrating a line image which serves as a reference image.

FIG. 12A illustrates a line image or a reference image BK. This reference line image BK is a discontinuous line image formed by the LED head 27BK of the image forming unit 24, as in the case of FIG. 11A, and extends straight along the main scanning direction. Using the above reference line image BK as a test chart, the amount of deviation of each of the non-reference images formed by the LED heads 27Y to 27C of the other image forming units 21 to 23 is measured.

Figure 12B:
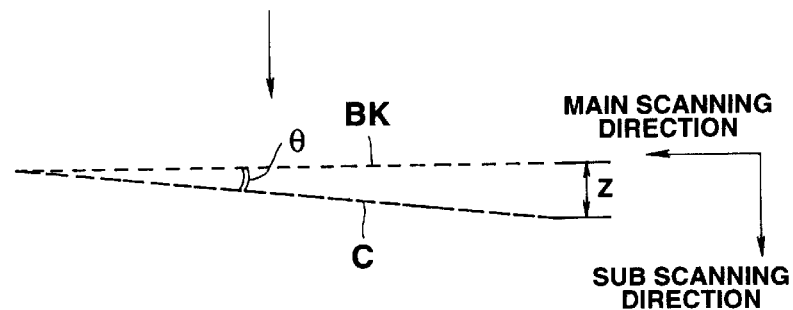
FIG. 12B is a diagram illustrating an image which has been formed by the optical writing head and which entails a θ-directional deviation from the reference image.

Let it be assumed that the LED head 27C has formed a non-reference image C deviating at an angle θ from the reference image BK in the sub scanning direction as seen in FIG. 12B, although the LED head 27C was to form an image coincident with the reference image BK. This matter suggests that the LED head 27C extends deviating from a direction in which the LED head 27BK extends. The amount of deviation of the non-reference image C from the reference image BK in the sub scanning direction is measured, a compensation value representing the amount of deviation is calculated, and the calculated compensation value is stored in the EEPROM 47 in advance. The LED head 27C makes the LEDs of the LED array chip 31 emit light in accordance with the set compensation value, thus forming an image in consideration of the deviation from the LED head 27BK.

Similarly, as regards the non-reference images formed by the other LED heads 27Y and 27M, the amount of deviation from the reference image BK is measured, a compensation value representing the amount of deviation is calculated, and light is emitted from the LEDs in accordance with the compensation value, thus forming an image in consideration of the deviation from the LED head 27BK.

The compensation values employed in the case of the third cause will now be explained.

As in the above-described cases, the amount of deviation of each of the non-reference images, formed by the LED heads 27Y to 27C of the image forming units 21 to 23, is measured. The compensation values as calculated are stored in the EEPROM 47 in advance. The LED heads 27Y to 27C cause the LEDs of the LED array chips 31 emit light in accordance with the set compensation values, thus forming images in consideration of the deviation from the LED head 27BK.

According to the second embodiment, as described above, images can be formed in consideration of the deviations occurring for the above-described three causes, by employing the compensation values representing the amounts of deviations of the non-reference images from the black (BK) reference image.

In the second embodiment, the deviations of the non-reference images from the reference image, due to a difference in the rotational speeds of the photosensitive drums 25 or a speed variation in the conveyor belt 12, are compensated for. However, what is called wow flutter caused by speed variations in other driving systems can also be reduced in the same manner as that described above. Furthermore, in the second embodiment, the driving means includes the CPU 45 and the head control section 48, while the drive timing control means includes the delay circuitries 68. However, the structures of the driving means and the drive timing control means are not limited to those described above, and any other structures can be employed.

The optical writing head driving device has been explained above. However, means for executing the individual procedures, such as calculation means and writing means each of which includes the CPU 45, etc., storage means including the EEPROM 47, and the drive timing control means including the delay circuit section 68, are not limited to the above-described specific structures. The storage of the compensation values, the driving process carried out by the driving means and the drive timing control process carried out by the drive timing control means may be realized by programs.

In the first and second embodiments, the compensation values representing the positional deviations of the LEDs and the compensation values representing the positional deviations of images to be combined into a color image are calculated, and the strobe signal (STB) is delayed in accordance with the compensation values so that the positional deviations are compensated for. However, image data may be read out in accordance with the compensation values.

The optical writing head driving process carried out by the optical writing head driving device of the third embodiment of the present invention, which reads out the image data in accordance with the positional deviations of the LEDs, etc., will now be described with reference to the drawings.

Figure 13:
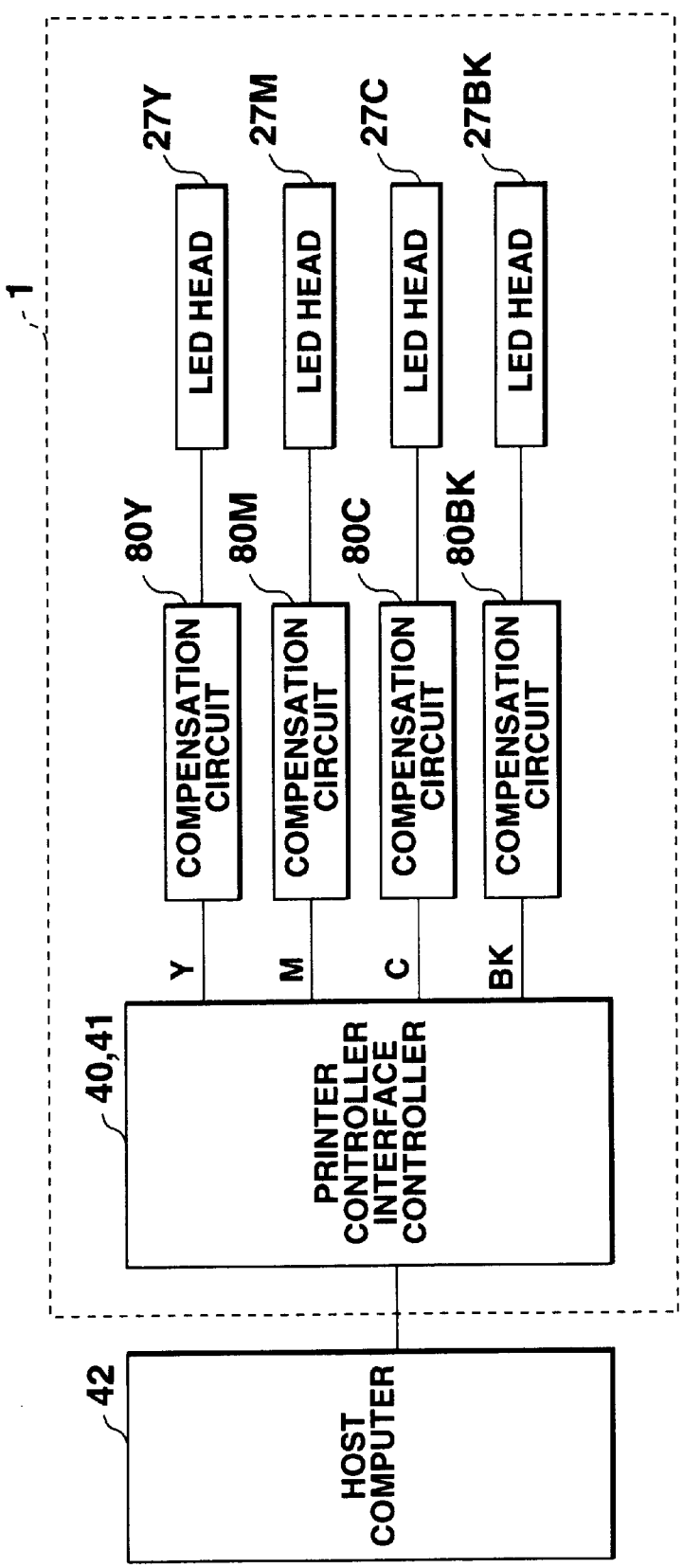
FIG. 13 is a schematic diagram exemplifying a color printer which employs an optical writing head according to the third embodiment of the present invention.

FIG. 13 is a block diagram showing a part of the color printer 1 employing the optical writing head driving device according to the third embodiment of the present invention. The color printer 1 has the interface controller 40, the printer controller 41, compensation circuits 80Y to 80BK and the LED heads 27Y to 27BK. In addition to those parts of the color printer 1 of the first embodiment which are illustrated in FIG. 3, the color printer 1 illustrated in FIG. 12 includes the compensation circuits 80Y to 80BK. Structures other than the compensation circuits 80Y to 80BK are the same as those of the first embodiment. In FIG. 13, the interface controller 40 and the printer controller 41 are shown in the same block.

The compensation circuits 80Y to 80BK stores in advance the compensation values representing the positional deviations of the LED array chips 31 of the LED heads 27Y to 27BK. The compensation circuits 80Y to 80BK sequentially store the bit map data sent from the printer controller 41. The bit map data is read out from the compensation circuits 80Y to 80BK in accordance with the compensation values, and is supplied to the LED heads 27Y to 27BK.

Figure 14:
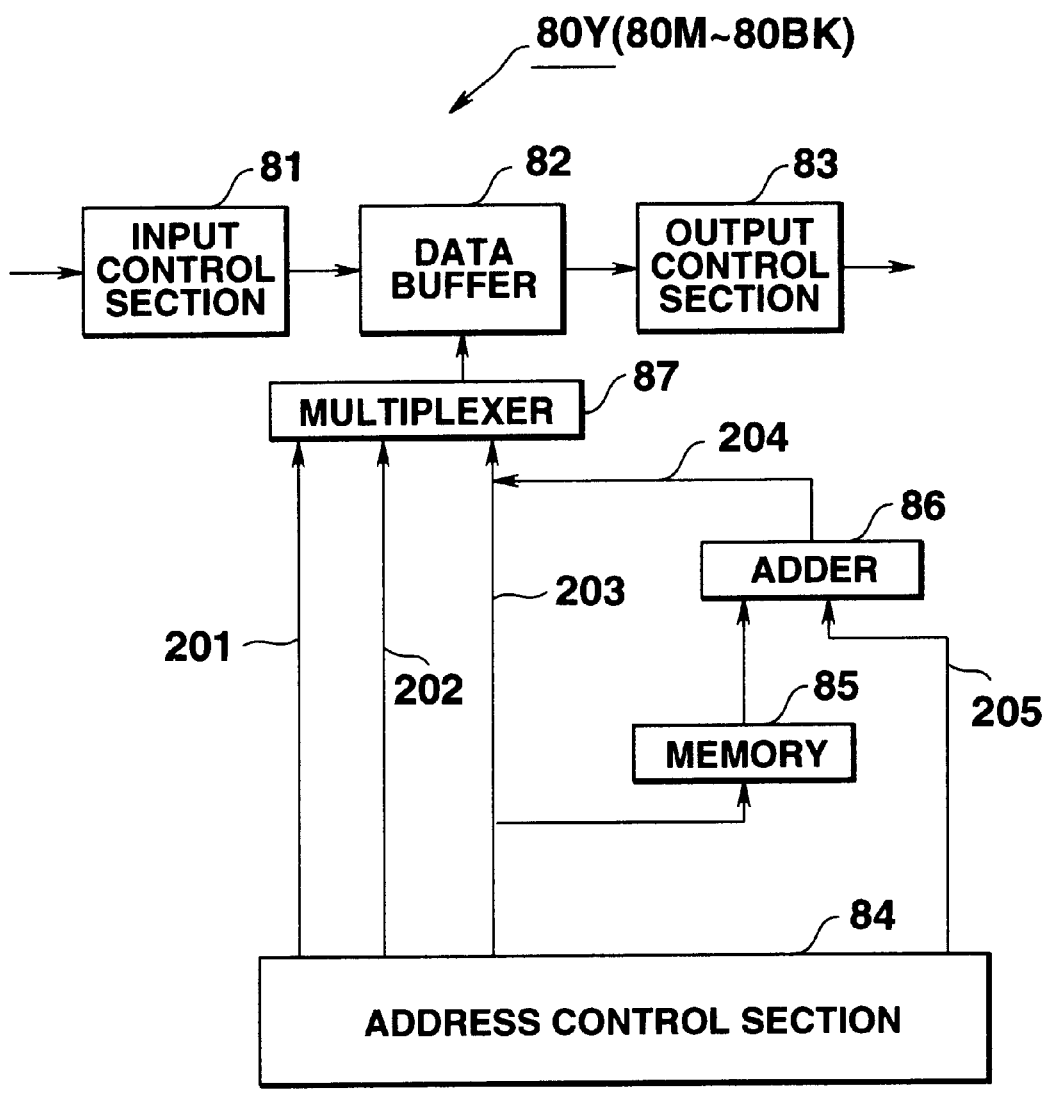
FIG. 14 is a diagram illustrating a compensation circuit included in the optical writing head according to the third embodiment of the present invention.

FIG. 14 is a block diagram showing one of the compensation circuits 80Y to 80BK in detail. Each compensation circuit includes an input control section 81, a data buffer 82, an output control section 83, an address control section 84, a memory 85, an adder 86 and a multiplexer 87.

The input control section 81 receives bit map data from the printer controller 41, and supplies the bit map data of the amount corresponding to the predetermined number of lines to the data buffer 82.

The data buffer 82 receives the bit map data sent from the input control section 81, and stores the bit map data of the amount corresponding to the predetermined number of lines. For example, bit map data corresponding to twenty lines is written in the memory areas each being designated by a main scanning direction write address 201 and a sub scanning direction write address 202 which are sent from the address control section 84 through the multiplexer 87.

Furthermore, the data buffer 82 outputs the bit map data stored therein to the output control section 83. More specifically, the bit map data is read out from the memory areas each being designated by a main scanning direction read address 203 sent from the address control section 84 through the multiplexer 87 and a sub scanning direction read address 204 sent from the adder 86. The read-out bit map data is output to the output control section 83.

The output control section 83 receives the bit map data from the data buffer 82, and sequentially supplies the received data to the LED head 27.

The address control section 84 generates write and read addresses and supplies them to the data buffer 82 through the multiplexer 87.

The memory 85 stores in advance the compensation values representing the positional deviations of the individual LED array chips 31 of the LED head 27.

The adder 86 adds a compensation value stored in the memory 85 and the sub scanning direction read address 205 sent from the address control section 84, and generates a corrected sub scanning direction read address 204 as a result. The adder 86 supplies the corrected sub scanning direction read address 204 to the multiplexer 87.

The multiplexer 87 alternatively supplies the write and read addresses to the data buffer 82.

In each of the compensation circuits 80Y to 80BK, the memory 85 prestores the compensation values representing the positional deviations of the LED array chips 31 which a corresponding one of the LED heads 27Y to 27BK has. The data buffer 82 receives the bit map data sent from the printer controller 41 through the input control section 81, and stores the received bit map data. In accordance with the compensation values stored in the memory 85, the stored bit map data is read out from the data buffer 82 and is supplied to a corresponding one of the LED heads 27Y to 27BK through the output control section 83.

Figure 15:
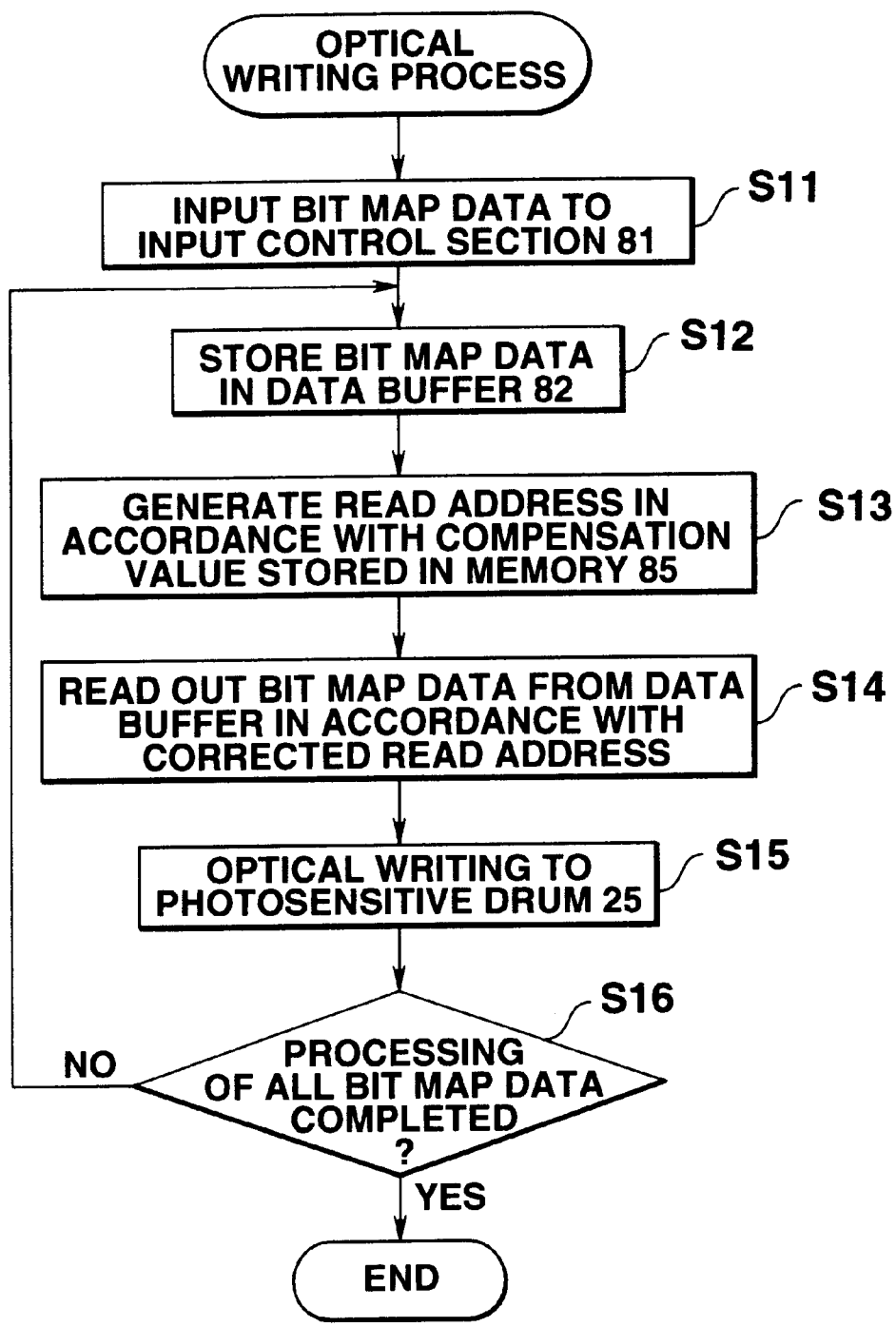
FIG. 15 is a flowchart showing an optical writing head driving process according to the third embodiment of the present invention.

The optical writing head driving process will now be explained with reference to FIG. 15. FIG. 15 is a flowchart showing the optical writing head driving process carried out by the optical writing head driving device.

First of all, the input control section 81 receives the bit map data (DATA) from the printer controller 41. The input control section 81 sequentially inputs the received bit map data to the data buffer 82 (step S11).

The data buffer 82 stores the bit map data input from the input control section 81 in the memory areas designated by the main scanning direction write address 201 and the sub scanning direction write address 202 which are sent from the address control section 84 through the multiplexer 87 (step S12). The data buffer 82 stores the bit map data of the amount corresponding to the predetermined number of lines.

The address control section 84 supplies the main scanning direction read address 203 to the multiplexer 87. Furthermore, the address control section 84 supplies the sub scanning direction read address 205 to the adder 86. The adder 86 adds the received read address 205 and a compensation value prestored in the memory 85, generates the corrected sub scanning direction read address 204, and supplies the read address 204 to the multiplexer 87 (step S13).

The output control section 83 reads out the bit map data from the memory areas designated by the main scanning direction read address 203 supplied from the multiplexer 87 and the corrected sub scanning direction read address 204, and supplies the read-out bit map data to the LED head 27 (step S14).

The LED head 27 makes the LEDs emit light in accordance with the received bit map data, thus optically writing image information on the photosensitive drum 25 (step S15).

Each of the compensation circuits 80Y to 80BK determines whether the processing of all bit map data has been completed (step S16). When each compensation circuit determines that the processing of all bit map data has not yet been completed, it repeats the steps S11 to S15.

Figures 16A, 16B:
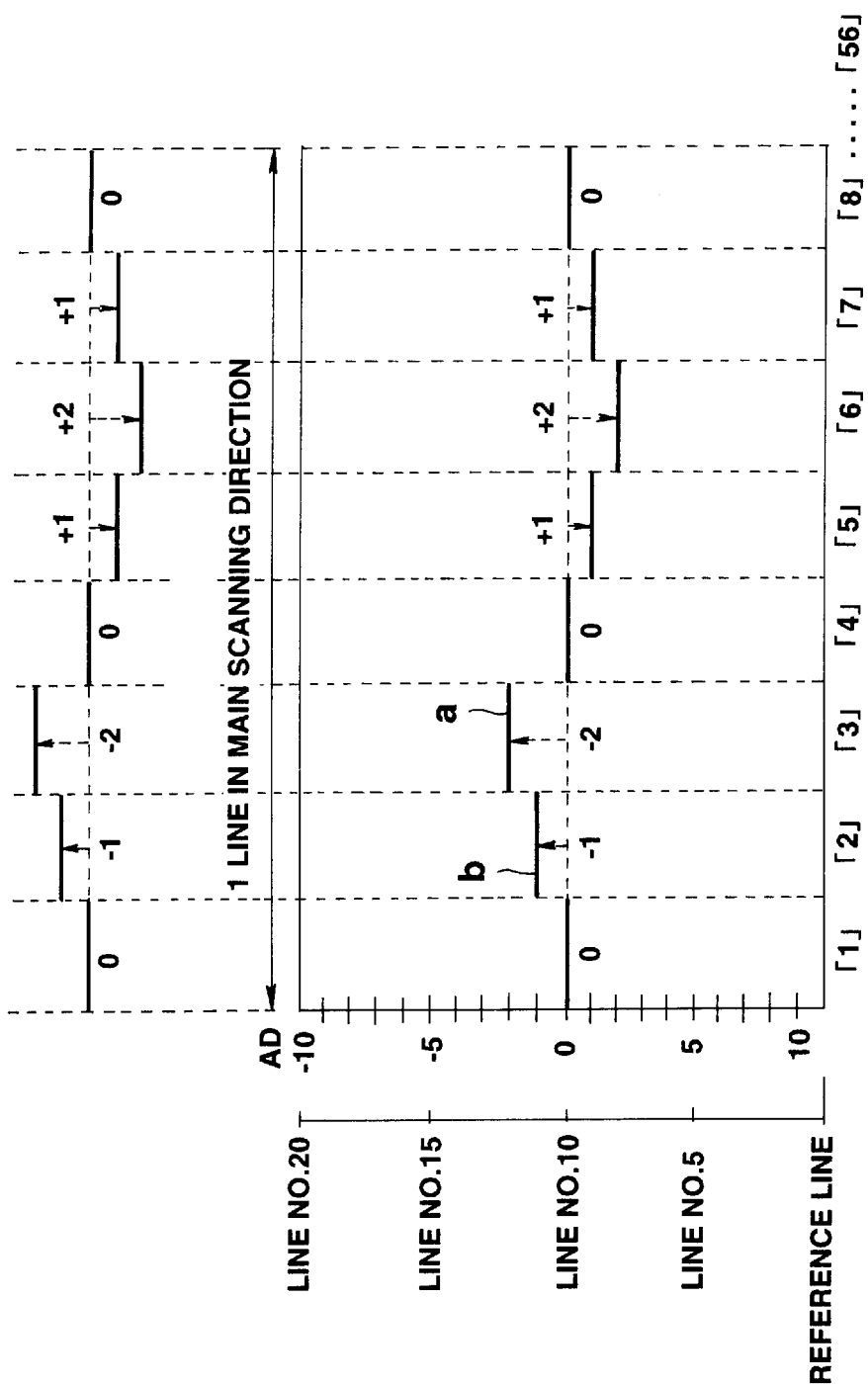
FIG. 16A is a schematic diagram exemplifying compensation values prestored in a memory included in the optical writing head.
FIG. 16B is a schematic diagram showing bit map data arranged line by line in correspondence with the compensation values prestored in the memory of the optical writing head.

The optical writing head driving process will now be explained in more detail, with reference to FIGS. 16A and 16B. FIG. 16A is a schematic diagram exemplifying the compensation values prestored in the memory 85. FIG. 16B is a schematic diagram showing the bit map data stored in the data buffer 82. In FIG. 16B, those areas of the memory 85 which store the bit map data are arranged in matrix form along the main and sub scanning directions.

As in the case of the first embodiment, the compensation values shown in FIG. 16A are those obtained from the positional deviations of the LED array chips 31 which were measured by supplying the drive signals to the individual LEDs after the manufacturing of the LED heads such that the LEDs emitted light. The printer controller 41 may prestore in the EEPROM 47 the compensation values shown in FIG. 16A, and may transfer those values to the memory 85 at the time the power is turned on.

Each of the LED heads 27Y to 27BK has 56 LED array chips 31. For convenience of explanation, however, the compensation values for LED array chips Nos. [1] to [8] of the LED array chips 31 will be discussed in the following:

In FIG. 16A, LED array chips Nos. [1], [4] and [8] of the LED array chips 31 are arranged along the "0" line. LED array chip [2] deviates by "−1" from the "0" line, LED array chip No. [3] deviates by "−2" from the "0" line, LED array chip No. [5] deviates by "+1" from the "0" line, LED array chip No. [6] deviates by "+2" from the "0" line, and LED array chip No. [7] deviates by "3+1" from the "0" line. The compensation values representing such deviations are stored in the memory 85 of each of the compensation circuits 80Y to 80BK.

The image forming process, which the optical writing head driving device executes under the condition wherein the compensation values have been set in each of the compensation circuits 80Y to 80BK, will now be explained.

The host computer 42 outputs print data to the interface controller 40. The interface controller 40 converts the received print data to bit map data, and supplies the bit map data to the printer controller 41.

The printer controller 41 generates control data corresponding to the received bit map data, and supplies the control data to the compensation circuits 80Y to 80BK, together with the bit map data.

In each of the compensation circuits 80Y to 80BK, the input control section 81 receives the bit map data sent from the printer controller 41, and the data buffer 82 sequentially stores the received bit map data. More specifically, the data buffer 82 sequentially stores, line by line, the bit map data in the order of the arrangement of the 56 LED array chips 31 and in accordance with the main scanning direction write address 201 and the sub scanning direction write address 202 which are sent from the address control section 84 through the multiplexer 87.

The data buffer 82 sequentially stores the bit map data corresponding to twenty lines, as shown in FIG. 16B.

The bit map data corresponding to twenty lines is read out from the data buffer 82 in accordance with the read addresses which are supplied from the address control section 84 and the adder 86 through the multiplexer 87. To be specific, the bit map data stored in the data buffer 82 is read out in accordance with the main scanning direction read address 203 sent from the address control section 84 through the multiplexer 87 and the corrected sub scanning direction read address 204 sent from the adder 86. The read-out bit map data is supplied to a corresponding one of the LED heads 27Y to 27BK through the output control section 83.

Since the sub scanning direction read address 204 is a value to which a compensation value stored in the memory 85 has been added, image data is attained with the positional deviations of the LED array chips 31 in the sub scanning direction being compensated for.

Explanations will now be made based on FIGS. 16A and 16B.

As shown in FIG. 16B, the data buffer 82 sequentially stores the bit map data corresponding to twenty lines.

Varying the main scanning direction read address 203, the address control section 84 sequentially designates the bit map data items which are to form the line which the sub scanning direction read address 205 is currently designating as the line to be printed. The adder 86 sequentially adds the compensation values stored in the memory 85 to the sub scanning direction read address 205, and generates the corrected sub scanning direction read address 204, which sequentially designates the memory areas storing the bit map data items.

Let it be assumed that the sub scanning address 205 generated by the address control section 84 is currently specifying line No. ⌈10⌋. In this case, the memory areas storing the bit map data items, each of which is constituted by 64 bits and which are arranged in the order of the arrangement of the LED array chips 31, are sequentially designated by the corrected sub scanning direction read address 204 and the main scanning direction read address 203. To be specific, in FIG. 16A, the compensation value representing the positional deviation of LED array chip No. ⌈1⌋ is "0", under which condition the output control section 83 reads out a bit map data item from an area designated by both No. ⌈10⌋, which the corrected sub scanning direction read address 204 specifies, and No. ⌈1⌋ which the main scanning read address 203 specifies. The compensation value representing the positional deviation of LED array chip No. ⌈2⌋ is "−1" in FIG. 16A, under which condition the output control section 83 reads out a bit map data item from an area designated by both No. ⌈11⌋, which the corrected sub scanning direction read address 204 specifies, and No. ⌈2⌋ which the main scanning read address 203 specifies. As regards remaining LED array chips Nos. ⌈3⌋ to ⌈56⌋, the output control section 83 similarly reads out bit map data items sequentially in accordance with the corrected sub scanning direction read address 204 and the main scanning read address 203.

When the reading out of the bit map data corresponding to one line is completed controlling the addresses sequentially, the compensation circuit 80Y, for example, outputs the bit map data to the LED head 27Y. Then, the LED head 27Y optically writes the bit map data (a stepped image shown by solid lines in FIG. 16B) corresponding to one line on the photosensitive drum 25Y. As regards the remaining lines, the same procedures as those described above are conducted. Since the direction in which the LED array chips of the same optical writing head deviate do not vary, bit map data corresponding to the remaining lines can also be printed in the intended print positions by using the same compensation values as those used to print the prior line.

Figure 17A:
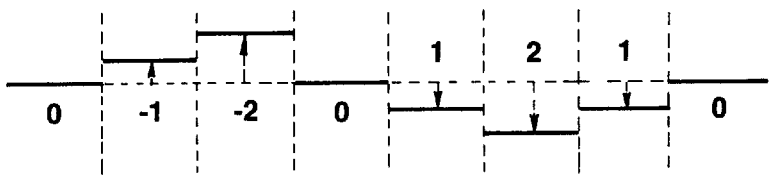
FIG. 17A is a schematic diagram showing the positional deviations of LED array chips.
Figure 17B:
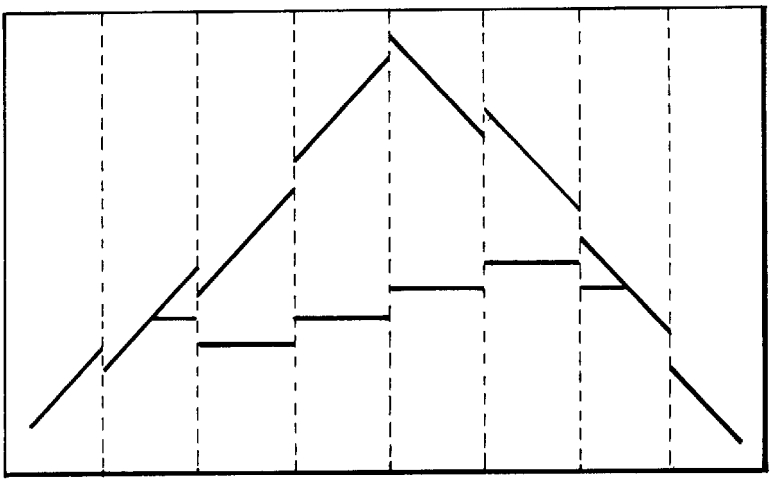
FIG. 17B is a schematic diagram showing bit map data read out in accordance with a sub scanning direction read address as corrected.
Figure 17C:
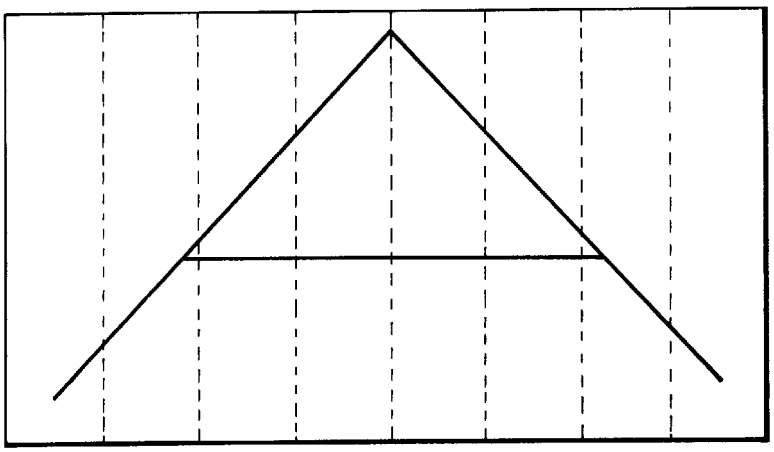
FIG. 17C shows a precise print image.

In the case where the LED array chips 31 deviate from their respective designed positions as shown in FIG. 17A, bit map data which forms the image shown in FIG. 17B is read out from the data buffer 82 by the above-described reading control procedures. The image illustrated in FIG. 17B is one in which the positional deviations of the LED array chip 31 have been compensated for. When this image is optically written on the photosensitive drum 25, the electrostatic latent image illustrated in FIG. 17C is formed to print a precise print image.

According to the third embodiment of the present invention, the positional deviations of the LED array chips 31 are compensated for as described above, and images are printed in the accurate positions on a sheet of paper P. In the optical writing head driving device of the third embodiment of the present invention, since the compensation can be easily achieved using the delayed strobe signal, the manufacturing time can be reduced, and the precision with which the optical writing heads are manufactured can be set lower than conventionally, in order to improve the manufacturing yield.

In this embodiment also, the amount in which each of the LEDs forming the LED array chips 31 deviates in the sub scanning direction from the designed position can be stored in the memory 85 as compensation data, and addressing can be performed in accordance with the positional deviation of each LED.

According to the third embodiment, the positional deviation of each of the LED array chips 31 is compensated for. However, the positional deviation of each LED may be compensated for. In this case, the positional deviation of each LED in the sub scanning direction is compensated for so that an image can be printed in the accurate position on a sheet of paper P.

In the first to third embodiments described above, the positional deviations of all LED array chips 31 are measured, and the compensation values for all LED array chips 31 are derived from the measured positional deviations. However, the positional deviations of selected LED array chips 31 may be measured, and the compensation values for all LED array chips 31 may be derived from the positional deviations thus measured.

The optical writing head driving process performed by the optical writing head driving device of the fourth embodiment of the present invention, which derives the compensation values for all LED array chips from the positional deviations of selected LED array chips, will now be described with reference to the drawings.

Figure 18:
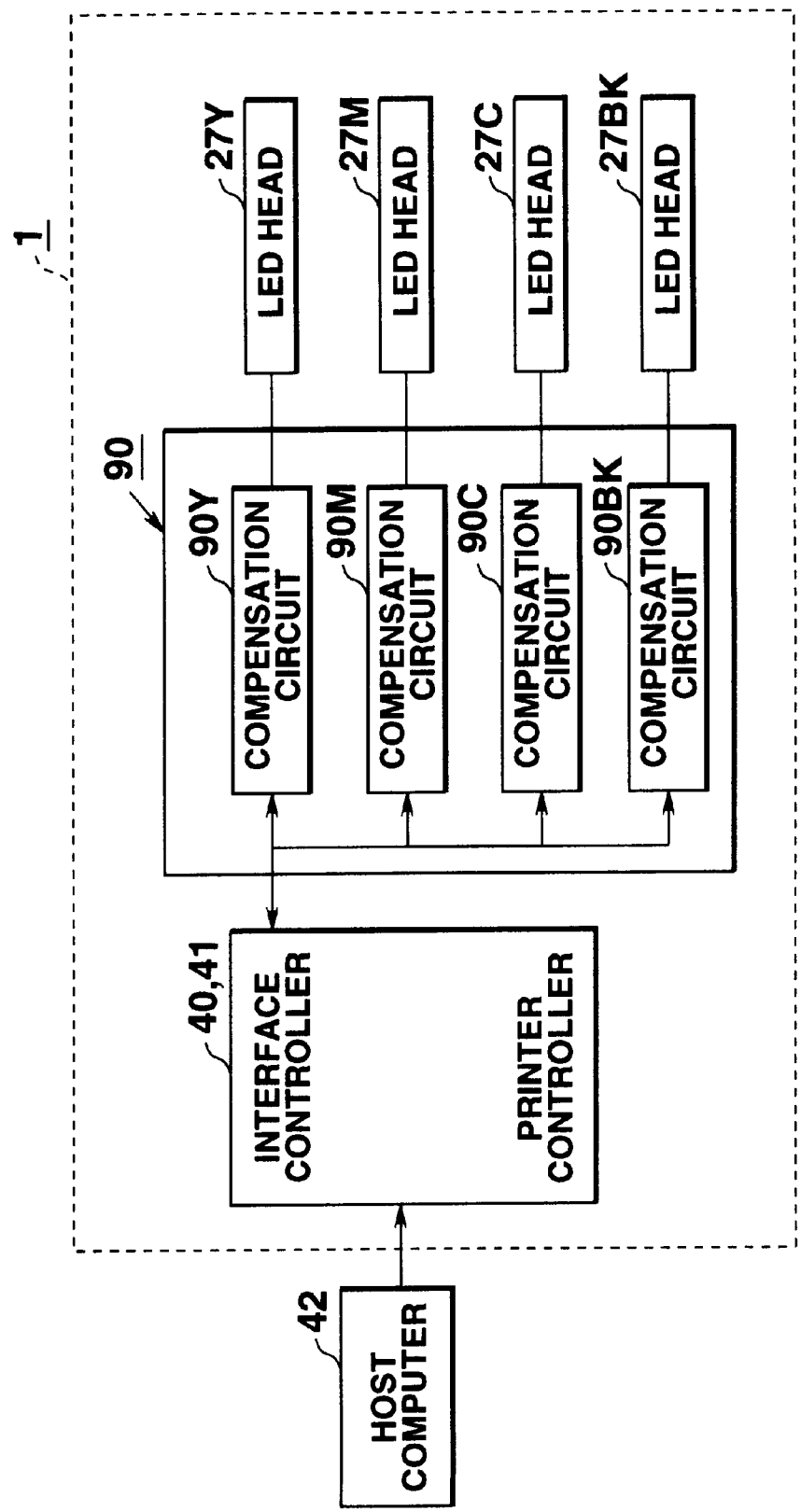
FIG. 18 is a block diagram exemplifying a color printer which employs an optical writing head according to the fourth embodiment of the present invention.

FIG. 18 is a block diagram showing the structure of a part of the color printer 1 employing the optical writing head driving device according to the fourth embodiment of the present invention. The color printer 1 has the interface controller 40, the printer controller 41, a control circuit 90 and the LED heads 27Y to 27BK. In addition to those parts of the color printer 1 of the first embodiment which are shown in FIG. 3, the color printer 1 illustrated in FIG. 18 includes the control circuit 90. Structures other than the control circuit 90 are the same as those of the first embodiment. In FIG. 13, the interface controller 40 and the printer controller 41 are shown in the same block.

The control circuit 90 includes four compensation circuits 90Y to 90BK.

Figure 19:
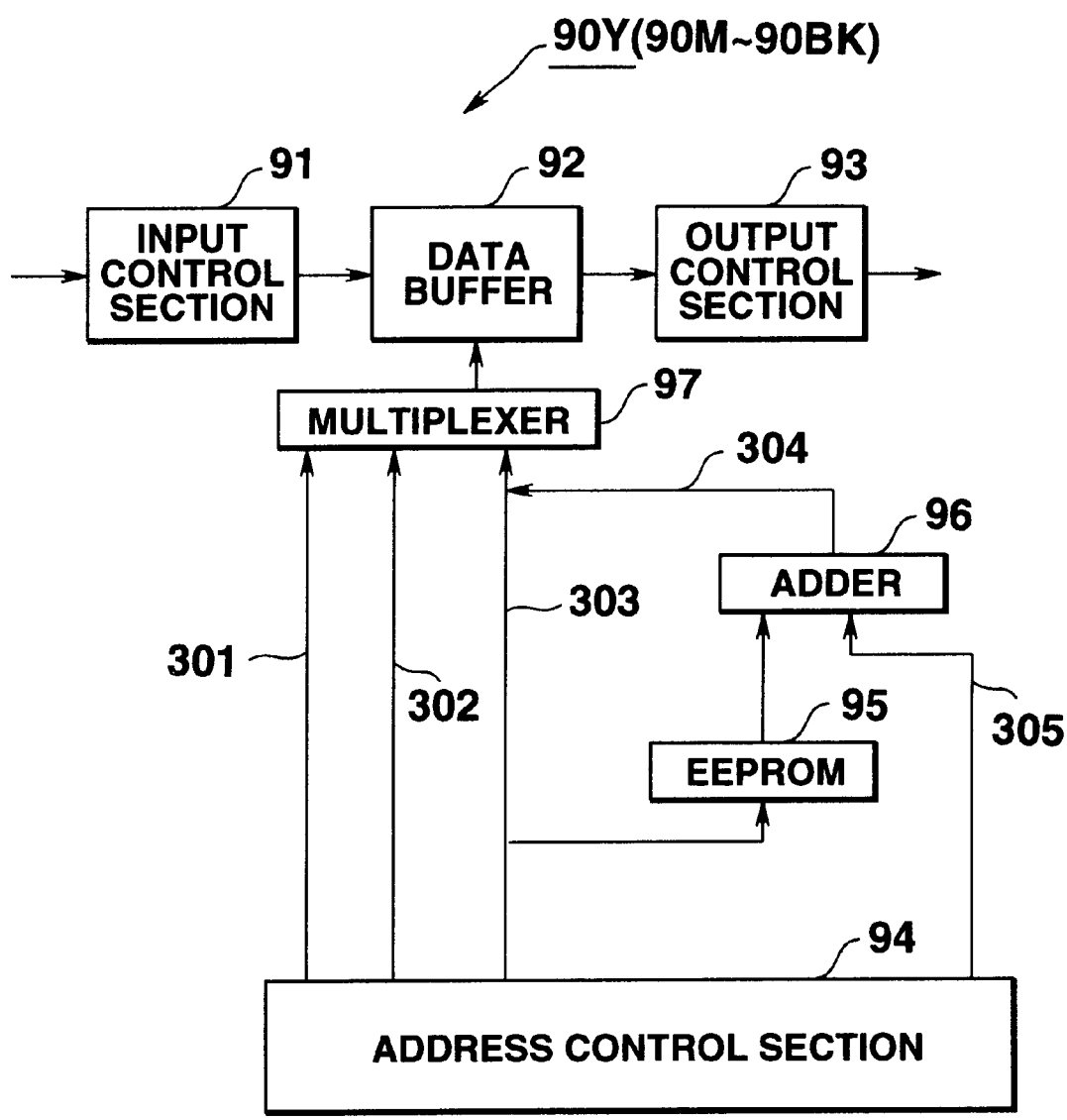
FIG. 19 is a diagram illustrating a compensation circuit included in the optical writing head according to the fourth embodiment of the present invention.

FIG. 19 is a block diagram showing the structure of one of the compensation circuits 90Y to 90BK in detail. Each compensation circuit includes an input control section 91, a data buffer 92, an output control section 93, an address control section 94, an EEPROM 95, an adder 96 and a multiplexer 97.

The input control section 91 receives bit map data from the printer controller 41, and supplies the bit map data of the amount corresponding to the predetermined number of lines to the data buffer 92.

The data buffer 92 receives the bit map data sent from the input control section 91, and stores the bit map data of the amount corresponding to the predetermined number of lines. For example, bit map data which corresponds to twenty lines is written in the memory areas each being designated by a main scanning direction write address 301 and a sub scanning direction write address 302 which are sent from the address control section 94 through the multiplexer 97.

Furthermore, the data buffer 92 outputs the bit map data stored therein to the output control section 93. More specifically, the bit map data is read out from the memory areas each being designated by a main scanning direction read address 303 sent from the address control section 94 through the multiplexer 97 and a sub scanning direction read address 304 sent from the adder 96. The read-out bit map data is output to the output control section 93.

The output control section 93 receives the bit map data from the data buffer 92, and sequentially supplies the received data to the LED head 27.

The address control section 94 generates the write and read addresses and supplies them to the data buffer 92 through the multiplexer 97.

The EEPROM 95 stores in advance the compensation values representing the positional deviations of the LED array chips 31 of the LED head 27. The EEPROM 95 is removably provided on the control circuit 90.

The adder 96 adds a compensation value stored in the EEPROM 95 and the sub scanning direction read address 305 sent from the address control section 94, and generates a corrected sub scanning direction read address 304 as a result. The adder 86 supplies the corrected sub scanning direction read address 304 to the multiplexer 97.

The multiplexer 97 alternatively supplies the write and read addresses to the data buffer 92.

In each of the compensation circuits 90Y to 90BK, the EEPROM 95 prestores the compensation values representing the positional deviations of the LED array chips 31 which a corresponding one of the LED heads 27Y to 27BK has. The data buffer 92 receives the bit map data sent from the printer controller 41 through the input control section 91, and stores the received bit map data. In accordance with the compensation values stored in the memory 95, the stored bit map data is read out from the data buffer 92 and is supplied to a corresponding one of the LED heads 27Y to 27BK through the output control section 93.

FIG. 20A is a schematic diagram showing the actual positional deviations of the LED array chips 31. In FIG. 20A, the axis of abscissas shows the chip numbers assigned to the 56 LED array chips 31, while the axis of ordinates shows the positional deviations of the LED array chips 31.

As mentioned previously, there is the case where the LED array chips 31 may deviate from their designed positions in the sub scanning direction. Furthermore, there is also the case where lenses such as a convergent photoconductor array or the like are arranged undesirably in a distorted state between the LED array chips 31 and the photosensitive drums 25. The optical writing head driving device of the fourth embodiment of the present invention measures the positional deviations of selected LED array chips 31, not the positional deviations of all LED array chips 31.

As an example, five LED array chips Nos. ⌈1⌋, ⌈14⌋, ⌈28⌋, ⌈42⌋ and ⌈56⌋ of the LED array chips 31 were selected so that they were as equidistant as possible from each other, and the positional deviations of those LED array chips 31 were measured.

The positional deviations of selected LED array chips Nos. ⌈1⌋, ⌈14⌋, ⌈28⌋, ⌈42⌋ and ⌈56⌋ of the LED array chips 31 were measured in the following manner. After the manufacturing of the LED heads, the drive signals were supplied to the LED array chips 31 such that their individual LEDs emitted light rays. The positions of the light rays emitted from the LEDs were accurately detected by an image pickup device such as a CCD sensor or the like, thus measuring the positional deviations of the LED array chips 31.

The positional deviations of selected LED array chips Nos. ⌈1⌋, ⌈14⌋, ⌈28⌋, ⌈42⌋ and ⌈56⌋ are shown by black points (a1 to a5) in FIG. 20B.

The positional deviations of all LED array chips 31 were derived from thus measured positional deviations of the selected LED array chips 31 in order to obtain the compensation values. In the fourth embodiment of the present invention, the positional deviations of the other LED array chips 31 are those calculated using the following approximate expressions:

LED array chips Nos. ⌈2⌋ to ⌈14⌋
: $\Delta Y_n = -(I_{1-n}/I_{1-13} \times y_{14})$ LED array chips Nos. ⌈15⌋ to ⌈28⌋
: $\Delta y_n = -y_{14} - \{(I_{14-n}/I_{14-28}) \times (y_{28} - y_{14})\}$ LED array chips Nos. ⌈29⌋ to ⌈42⌋
: $\Delta y_n = -y_{28} - \{(I_{28-n}/I_{28-42}) \times (y_{42} - y_{28})\}$ LED array chips Nos. ⌈43⌋ to ⌈56⌋
: $\Delta y_n = -y_{42} - \{(I_{42-n}/I_{42-56}) \times (y_{56} - y_{42})\}$ $\Delta y_n$ = Approximation to deviation of LED array chip 31 (compensation value of LED array chip 31)

$y_x$ = Amount of deviation of sampled chip

I = Intervals (equal intervals) between chips

The compensation value $\Delta y_n$ of an arbitrary array chip "n" of LED array chips Nos. ⌈2⌋ to ⌈14⌋ is equal to $$-(I_{1-n}/I_{1-13} \times y_{14})$$

where "$I_{1-n}/I_{1-13}$" is a gradient showing the positional deviations of LED array chips Nos. ⌈1⌋ to ⌈14⌋ shown in FIG. 20B, while "$y_{14}$" is a value representing an error of measurement. The reason the minus sign "−" is attached to the multiplication result "$I_{1-n}/I_{1-13} \times y_{14}$" is that the compensation value to compensate for the amount of deviation is to be calculated.

The compensation value $\Delta y_n$ of an arbitrary array chip n of LED array chips Nos. ⌈15⌋ to ⌈28⌋ is equal to $$-y_{14} - \{(I_{14-n}/I_{14-28}) \times (y_{28} - y_{14})\}$$

where "$I_{14-n}/I_{14-28}$" is a gradient showing the positional deviations of LED array chips Nos. ⌈14⌋ to ⌈28⌋ shown in FIG. 20B, while "$y_{28} - y_{14}$" is a value representing an error of measurement. The reason the value "$y_{14}$" is subtracted from the multiplication result "$(I_{14-n}/I_{14-28}) \times (y_{28} - y_{14})$" is that the multiplication result is an accumulation of compensation values.

The compensation value $\Delta y_n$ of an arbitrary array chip n of LED array chips Nos. [29] to [42] is equal to $$-y_{28}-\{(I_{28-n}/I_{28-42})\times(y_{42}-y_{28})\}$$

where "$I_{28-n}/I_{28-42}$" is a gradient showing the positional deviations of LED array chips Nos. [28] to [42] shown in FIG. 20B, while "$y_{42}-y_{28}$" is a value representing an error of measurement.

The compensation value $\Delta y_n$ of an arbitrary array chip n of LED array chips Nos. [43] to [56] is equal to $$-y_{42}-\{(I_{42-n}/I_{42-56})\times(y_{56}-y_{42})\}$$

where "$I_{42-n}/I_{42-56}$" is a gradient showing the positional deviations of LED array chips Nos. [42] to [56] shown in FIG. 20B, while "$y_{56}-y_{42}$" is a value representing an error of measurement.

The compensation values of the individual LED array chips, that is, the approximations shown by discontinuous lines in FIG. 20B, are derived from the above formulas. The compensation values thus derived are stored in the EEPROM 95.

Figure 21:
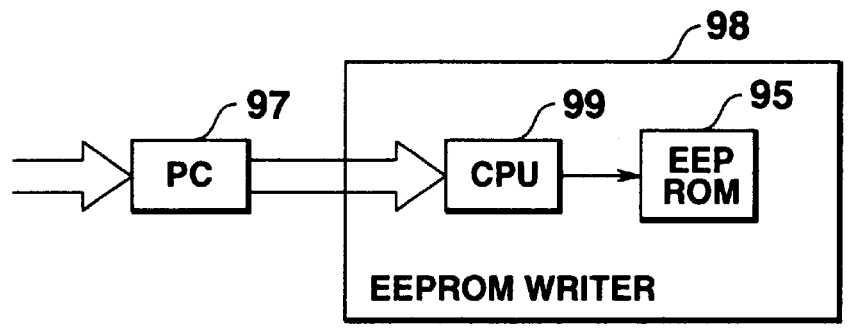
FIG. 21 is a diagram explaining the writing of the compensation values into an EEPROM.
Figure 22:
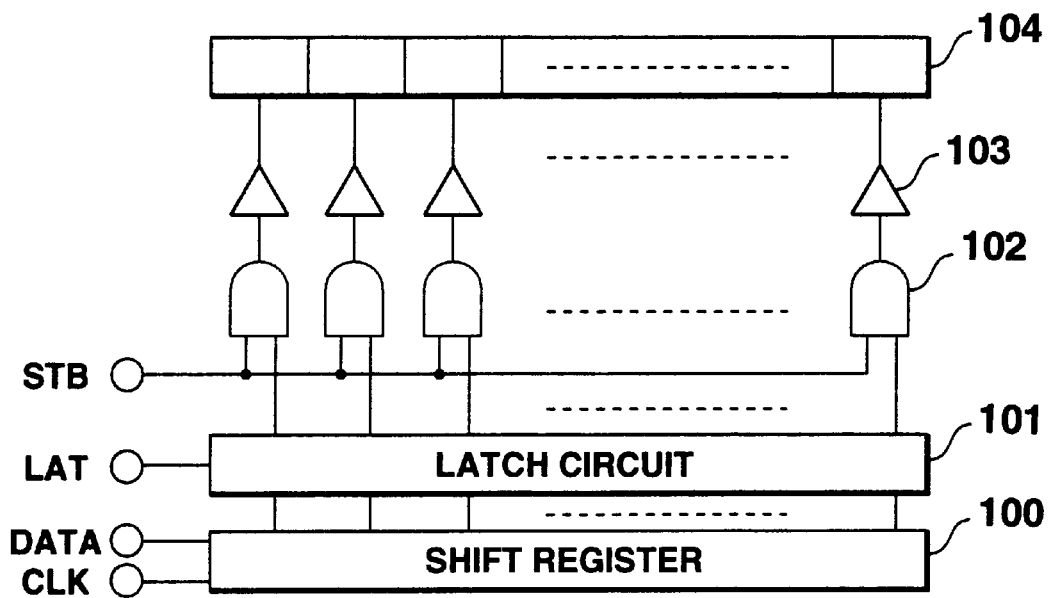
FIG. 22 is a circuit diagram exemplifying a conventional optical writing head.
Figure 23:
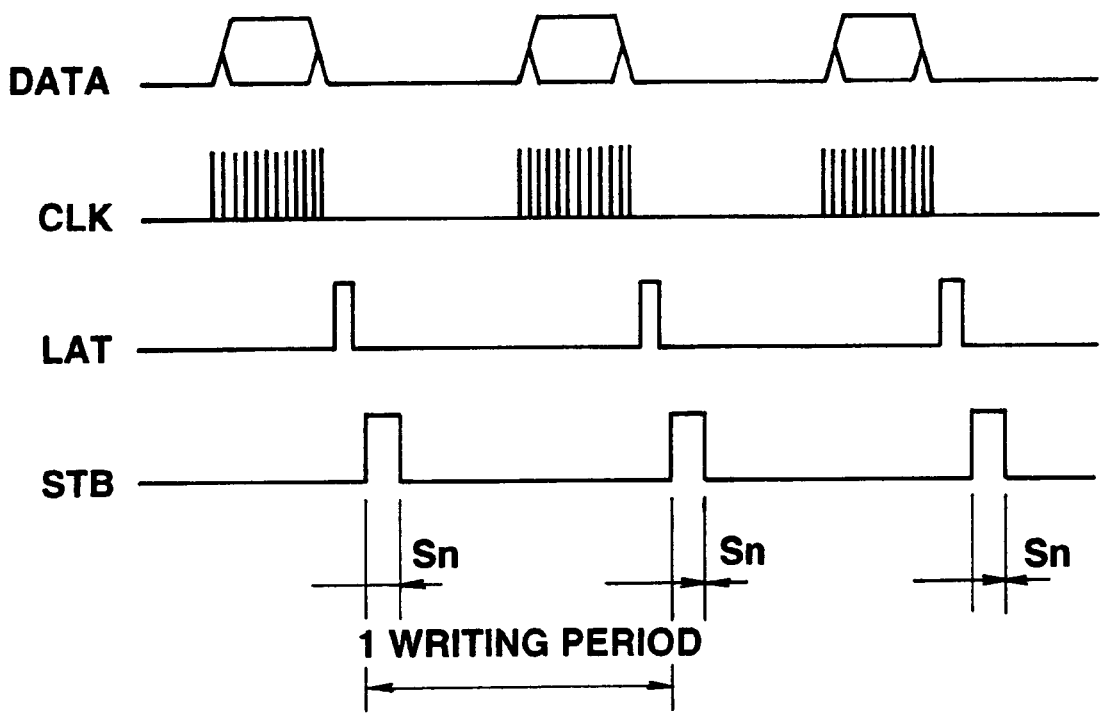
FIG. 23 is a timing chart showing the timing of the operation of the conventional optical writing head.
Figure 24A:
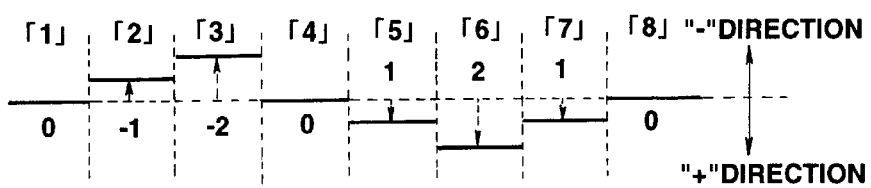
FIG. 24A is a schematic diagram showing the positional deviations of LED array chips.
Figure 24B:
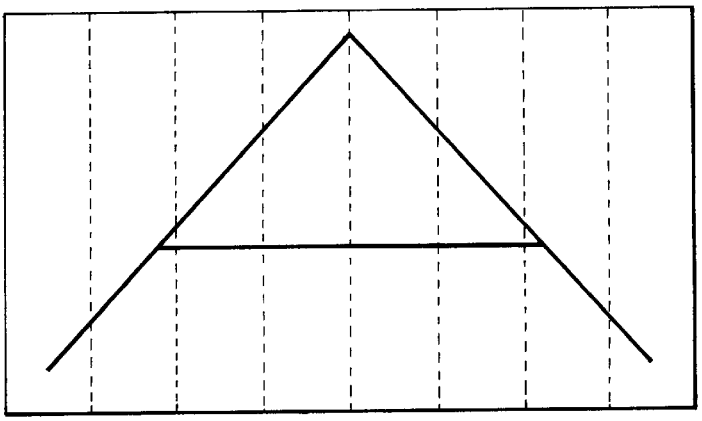
FIG. 24B is a schematic diagram illustrating an image which entails no positional deviation.
Figure 24C:
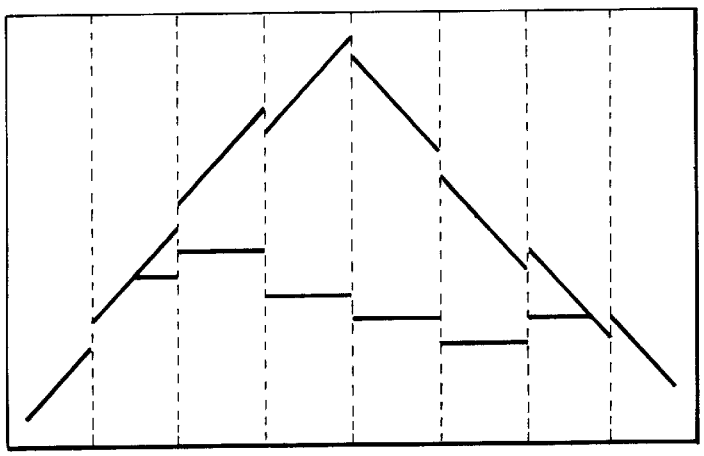
FIG. 24C is a schematic diagram illustrating an image formed by an LED array chip which deviates from a designed position.

FIG. 21 is a diagram which schematically shows both an EEPROM writer 98 which writes the compensation values in the EEPROM 95, and a personal computer (PC) 97 which transfers the compensation values to the EEPROM writer 98. The EEPROM writer 98 illustrated in FIG. 21 is controlled by a CPU 99, which operates in accordance with a control program stored in a non-illustrated ROM. The EEPROM writer 98 receives the compensation values sent from the PC 97, and sequentially stores the received compensation values in the EEPROM 95.

The EEPROM 95, in which the compensation values have been thus written, is attached to the control circuit 90. The control circuit 90 performs the compensation for the deviations of images in accordance with the compensation values stored in the EEPROM 95.

The optical writing heads including the LED array chips have been explained in the above embodiments. However, the optical writing heads may be those including other optical writing elements.

What is claimed is:

1. An optical writing head driving device for driving an optical writing head which emits light and optically writes information on a photoconductor by illuminating said photoconductor with the light, said optical writing head having light emitting arrays which are arranged along a main scanning direction, at least one of said light emitting arrays being unaligned with ones of said light emitting arrays adjacent thereto, and each of which includes light emitting elements of a predetermined number, said optical writing head driving device comprising:

image data acquiring means for acquiring image data;

image data storing means comprising predetermined areas for storing the image data acquired by said image data acquiring means;

storing means for storing compensation data including compensation values representing approximations to amounts in which said light emitting arrays deviate from designed positions in a sub scanning direction;

image data readout means for reading out the image data from areas of said image data storing means which correspond to positional deviations of said light emitting arrays in the sub scanning direction, in accordance with the compensation data stored in said storing means; and driving means for causing said light emitting arrays to emit light, in accordance with the image data read out by said image data readout means;

wherein:

said optical writing head comprises first to fifty-sixth light emitting arrays as said light emitting arrays;

said storing means stores compensation values $\Delta y_n$, representing approximations to amounts of positional deviations of the first to fourteenth LED arrays, derived from a formula of $$\Delta y_n = -(I_{1-n}/I_{1-13} \times y_{14})$$

said storing means stores compensation values $\Delta y_n$, representing approximations to amounts of positional deviations of the fifteenth to twenty-eighth light emitting arrays, derived from a formula of $$\Delta y_n = -y_{14} - \{(I_{14-n}/I_{14-28}) \times (y_{28}-y_{14})\}$$

said storing means stores compensation values $\Delta y_n$, representing approximations to amounts of positional deviations of the twenty-ninth to forty-second light emitting arrays, derived from a formula of $$\Delta y_n = -y_{28} - \{(I_{28-n}/I_{28-42}) \times (y_{42}-y_{28})\}$$

and said storing means stores compensation values $\Delta y_n$, representing approximations to amounts of positional deviations of the forty-third to fifty-sixth light emitting arrays, derived from a formula of $$\Delta y_n = -y_{42} - \{(I_{42-n}/I_{42-56}) \times (y_{56}-y_{42})\}$$

where "n" is an n-th one of said first to fifty-sixth light emitting arrays, "$y_x$" represents an amount of positional deviation of a sampled x-th one of said first to fifty-sixth light emitting arrays, and "$I_{a-b}$" represents an interval between respective a-th and b-th ones of said first to fifty-sixth light emitting arrays.

2. An optical writing head driving device for driving an optical writing head which emits light and optically writes information on a photoconductor by illuminating said photoconductor with the light, said optical writing head having light emitting arrays which are arranged along a main scanning direction, at least one of said light emitting arrays being unaligned with ones of said light emitting arrays adjacent thereto, and each of which includes light emitting elements of a predetermined number, said optical writing head driving device comprising:

image data acquiring means for acquiring image data;

image data storing means comprising predetermined areas for storing the image data acquired by said image data acquiring means;

storing means for storing compensation data items representing amounts in which said light emitting arrays deviate from designed positions in a sub scanning direction;

image data readout means for reading out the image data from areas of said image data storing means which correspond to positional deviations of said light emitting arrays in the sub scanning direction, in accordance with the compensation data items stored in said storing means; and driving means for causing said light emitting arrays to emit light, in accordance with the image data read out by said image data readout means;

wherein said compensation data items include compensation values $\Delta y_n$ of an n-th light emitting array, representing approximations to amounts of positional deviations of i-th to k-th light emitting arrays, obtained from a formula of $$\Delta y_n = -y_i - \{(I_{i-n}/I_{i-k}) \times (y_k - y_i)\}$$

where "I" represents an interval between respective ones of said light emitting arrays.

3. An optical writing head driving device according to claim 2, wherein:

said image data acquiring means acquires two-dimensional image data of successive plural dot-lines to be printed;

said image data storing means stores the two-dimensional image data of successive plural dot-lines acquired by said image data acquiring means; and said image data readout means reads out the image data over successive plural dot-lines, so as to compensate for relative positional deviations of to-be-printed color images in the sub scanning direction based on the positional deviations of said light emitting elements in the sub scanning direction, in accordance with the compensation data items stored in said storing means.

4. An optical writing head driving device for driving an optical writing head which emits light and optically writes information on a photoconductor by illuminating said photoconductor with the light, said optical writing head having light emitting arrays which are arranged along a main scanning direction, at least one of said light emitting arrays being unaligned with ones of said light emitting arrays adjacent thereto, and each of which includes light emitting elements of a predetermined number, said optical writing head driving device comprising:

image data acquiring means for acquiring image data;

image data storing means comprising predetermined areas for storing the image data acquired by said image data acquiring means;

storing means for storing compensation data items representing amounts in which said light emitting arrays deviate from designed positions in a sub scanning direction;

image data readout means for reading out the image data from areas of said image data storing means which correspond to positional deviations of said light emitting arrays in the sub scanning direction, in accordance with the compensation data items stored in said storing means; and driving means for causing said light emitting arrays to emit light, in accordance with the image data read out by said image data readout means;

wherein said compensation data items include a compensation value of each light emitting array, obtained by interpolation based on detected positional deviations of sampled ones of said light emitting arrays.

5. An optical wiring head driving device according to claim 4, wherein:

said image data acquiring means acquires two-dimensional image data of successive plural dot-lines to be printed;

said image data storing means stores the two-dimensional image data of successive plural dot lines acquired by said image data acquiring means; and said image data readout means reads out the image data over successive plural dot lines, so as to compensate for relative positional deviations of to-be-printed color images in the sub scanning direction based on the positional deviations of said light emitting elements in the sub scanning direction, in accordance with the compensation data items stored in said storing means.

* * * * *